US011974005B2

(12) United States Patent
Drennan et al.

(10) Patent No.: US 11,974,005 B2
(45) Date of Patent: Apr. 30, 2024

(54) CELL PHONE CONTENT WATCH PARTIES

(71) Applicant: DISH Network L.L.C., Englewood, CO (US)

(72) Inventors: Ross Alan Drennan, Monument, CO (US); Grant Alexander Drennan, Monument, CO (US); Jesus Flores Guerra, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/543,852

(22) Filed: Dec. 7, 2021

(65) Prior Publication Data

US 2023/0179825 A1    Jun. 8, 2023

(51) Int. Cl.
*H04N 21/43*      (2011.01)
*H04N 21/2187*    (2011.01)
*H04N 21/462*     (2011.01)
*H04N 21/472*     (2011.01)
*H04N 21/845*     (2011.01)

(52) U.S. Cl.
CPC ... *H04N 21/43076* (2020.08); *H04N 21/2187* (2013.01); *H04N 21/4622* (2013.01); *H04N 21/47217* (2013.01); *H04N 21/8456* (2013.01)

(58) Field of Classification Search
CPC ......... H04N 21/43076; H04N 21/2187; H04N 21/4622; H04N 21/47217; H04N 21/8456; H04N 21/4316; H04N 21/242; H04N 21/2743; H04N 21/4223; H04N 21/4788
See application file for complete search history.

(56) References Cited

U.S. PATENT DOCUMENTS

| | | | |
|---|---|---|---|
| 6,081,830 A  | 6/2000 | Schindler |
| 6,237,025 B1 | 5/2001 | Ludwig et al. |
| 6,256,663 B1 | 7/2001 | Davis |
| 6,392,664 B1 | 5/2002 | White et al. |
| 6,519,771 B1 | 2/2003 | Zenith |

(Continued)

FOREIGN PATENT DOCUMENTS

| | | |
|---|---|---|
| CN | 103290360 B | 3/2016 |
| CN | 110430457 A | 11/2019 |

OTHER PUBLICATIONS

U.S. Appl. No. 17/087,815, filed Nov. 3, 2020.

(Continued)

*Primary Examiner* — Adil Ocak
(74) *Attorney, Agent, or Firm* — Wash Park IP Ltd.; John T. Kennedy

(57) ABSTRACT

Devices, systems and methods are described for facilitating a cell phone content watch party. A system includes a server, a host user device and a client user device—both coupled to the server, a content capture device (CCD) coupled to the host user device, and a content provider coupled to the host user device and the client user device. The content provider provides primary content segments. The CCD provides cell phone content which the host user device provides the cell phone content to the server. The server synchronizes a providing of the cell phone content with a presentation of the primary content segments by the client user device such that the presentations of the cell phone content and the primary content segments occur substantially simultaneously on the host user device and the client user device.

15 Claims, 3 Drawing Sheets

(56) References Cited

U.S. PATENT DOCUMENTS

| | | |
|---|---|---|
| 6,643,291 B1 | 11/2003 | Yoshihara et al. |
| 6,646,673 B2 | 11/2003 | Caviedes et al. |
| 6,754,904 B1 | 6/2004 | Cooper et al. |
| 7,143,428 B1 | 11/2006 | Bruck et al. |
| 8,015,306 B2 | 9/2011 | Bowman |
| 8,046,411 B2 | 10/2011 | Hayashi et al. |
| 8,223,185 B2 | 7/2012 | Gratton et al. |
| 8,316,400 B1 | 11/2012 | Kravets |
| 9,015,306 B2 | 4/2015 | Dupre et al. |
| 9,226,011 B2 | 12/2015 | Francisco |
| 9,252,950 B2 | 2/2016 | Caspi |
| 9,378,474 B1 | 6/2016 | Story, Jr. et al. |
| 9,471,809 B2 | 10/2016 | Garrett et al. |
| 9,544,624 B2 | 1/2017 | VanDuyn et al. |
| 9,654,817 B2 | 5/2017 | Li et al. |
| 10,135,887 B1 | 11/2018 | Esser et al. |
| 10,187,690 B1 | 1/2019 | Garcia et al. |
| 10,237,587 B2 | 3/2019 | Zanabria et al. |
| 10,536,741 B1 | 1/2020 | Madison et al. |
| 10,575,042 B2 | 2/2020 | Rennison et al. |
| 10,735,825 B1 | 8/2020 | Comito et al. |
| 10,757,366 B1 | 8/2020 | Kwatra et al. |
| 10,757,467 B1 | 8/2020 | Katz et al. |
| 10,762,474 B2 | 9/2020 | Frank et al. |
| 10,819,758 B1 | 10/2020 | Krutsch et al. |
| 10,939,148 B2 | 3/2021 | Sun |
| 11,019,113 B2 | 5/2021 | Kurata et al. |
| 11,051,059 B2 | 6/2021 | Dodson et al. |
| 11,082,467 B1 | 8/2021 | Hartnett et al. |
| 11,128,916 B2 | 9/2021 | Mayhew et al. |
| 11,166,065 B1 | 11/2021 | Camargo et al. |
| 11,303,947 B2 | 4/2022 | Bertolami et al. |
| 11,477,516 B2 | 10/2022 | Yoden |
| 11,502,864 B2 | 11/2022 | Moorefield et al. |
| 11,509,726 B2 | 11/2022 | Alsina et al. |
| 11,553,159 B1 | 1/2023 | Rothschild et al. |
| 11,588,869 B2 | 2/2023 | Gratton et al. |
| 11,606,597 B2 | 3/2023 | Tyer et al. |
| 11,758,245 B2 | 9/2023 | Marten |
| 11,762,917 B2 | 9/2023 | Frank et al. |
| 2002/0067909 A1 | 6/2002 | Iivonen |
| 2003/0009766 A1 | 1/2003 | Marolda |
| 2003/0097655 A1 | 5/2003 | Novak |
| 2003/0229900 A1 | 12/2003 | Reisman |
| 2004/0154040 A1 | 8/2004 | Ellis |
| 2004/0205811 A1 | 10/2004 | Grandy et al. |
| 2005/0204387 A1 | 9/2005 | Knudson et al. |
| 2005/0262542 A1 | 11/2005 | DeWeese et al. |
| 2006/0101022 A1 | 5/2006 | Yu et al. |
| 2006/0149850 A1 | 7/2006 | Bowman |
| 2006/0161621 A1 | 7/2006 | Rosenberg |
| 2006/0174312 A1 | 8/2006 | Ducheneaut et al. |
| 2006/0236352 A1 | 10/2006 | Scott |
| 2006/0271960 A1 | 11/2006 | Jacoby et al. |
| 2007/0157281 A1 | 7/2007 | Ellis et al. |
| 2007/0229651 A1 | 10/2007 | Nakajima |
| 2007/0283380 A1 | 12/2007 | Aoki et al. |
| 2008/0037785 A1 | 2/2008 | Gantman et al. |
| 2008/0163285 A1 | 7/2008 | Tanaka et al. |
| 2009/0063983 A1 | 3/2009 | Amidon et al. |
| 2009/0089840 A1 | 4/2009 | Shusman |
| 2009/0167839 A1 | 7/2009 | Ottmar |
| 2009/0205008 A1 | 8/2009 | Wollmershauser et al. |
| 2009/0319885 A1 | 12/2009 | Amento et al. |
| 2009/0327428 A1 | 12/2009 | Ramanathan et al. |
| 2010/0066804 A1 | 3/2010 | Shoemake et al. |
| 2010/0281108 A1 | 11/2010 | Cohen |
| 2010/0306671 A1 | 12/2010 | Mattingly et al. |
| 2011/0016172 A1 | 1/2011 | Shah |
| 2011/0069940 A1 | 3/2011 | Shimy et al. |
| 2011/0154417 A1 | 6/2011 | Civanlar et al. |
| 2011/0219307 A1 | 9/2011 | Mate et al. |
| 2011/0246908 A1 | 10/2011 | Akram et al. |
| 2012/0131110 A1 | 5/2012 | Buyukkoc et al. |
| 2012/0151345 A1 | 6/2012 | McClements, IV |
| 2012/0216300 A1 | 8/2012 | Vivolo et al. |
| 2012/0218262 A1 | 8/2012 | Yomdin et al. |
| 2012/0246679 A1 | 9/2012 | Chen |
| 2012/0296972 A1 | 11/2012 | Backer |
| 2013/0016955 A1 | 1/2013 | Pejaver |
| 2013/0031192 A1* | 1/2013 | Caspi .................. H04L 65/403 |
| | | 709/204 |
| 2013/0058632 A1 | 3/2013 | Jackson |
| 2013/0103814 A1 | 4/2013 | Carrasco et al. |
| 2013/0173765 A1 | 7/2013 | Korbecki |
| 2014/0068692 A1 | 3/2014 | Archibong et al. |
| 2014/0071344 A1* | 3/2014 | Francisco .......... H04N 21/2625 |
| | | 348/E5.009 |
| 2014/0096167 A1 | 4/2014 | Lang et al. |
| 2014/0150002 A1 | 5/2014 | Hough et al. |
| 2014/0195675 A1 | 7/2014 | Silver |
| 2014/0205261 A1 | 7/2014 | Courtemanche |
| 2014/0269757 A1 | 9/2014 | Park et al. |
| 2014/0325557 A1* | 10/2014 | Evans ................. H04N 21/458 |
| | | 725/32 |
| 2015/0052571 A1 | 2/2015 | Stokking et al. |
| 2015/0106360 A1 | 4/2015 | Cao et al. |
| 2015/0172338 A1 | 6/2015 | Moran et al. |
| 2015/0215352 A1 | 7/2015 | Wong et al. |
| 2015/0230004 A1 | 8/2015 | VanDuyn et al. |
| 2015/0245106 A1 | 8/2015 | Tian |
| 2015/0327024 A1 | 11/2015 | Yang et al. |
| 2016/0006981 A1 | 1/2016 | Bauman et al. |
| 2016/0021153 A1 | 1/2016 | Hull et al. |
| 2016/0044622 A1 | 2/2016 | Crowe et al. |
| 2016/0050160 A1 | 2/2016 | Li et al. |
| 2016/0182928 A1 | 6/2016 | Francisco |
| 2016/0241652 A1 | 8/2016 | Frazier et al. |
| 2016/0255041 A1 | 9/2016 | Lew et al. |
| 2016/0294894 A1* | 10/2016 | Miller .................. H04L 67/306 |
| 2016/0366203 A1 | 12/2016 | Blong et al. |
| 2017/0006322 A1 | 1/2017 | Dury et al. |
| 2017/0093769 A1 | 3/2017 | Lind et al. |
| 2017/0103664 A1* | 4/2017 | Wong .................... G09B 5/065 |
| 2017/0264920 A1 | 9/2017 | Mickelsen |
| 2017/0312626 A1 | 11/2017 | Colenbrander |
| 2017/0346926 A1 | 11/2017 | Charters et al. |
| 2018/0035136 A1 | 2/2018 | Crowe |
| 2018/0167427 A1 | 6/2018 | Kedenburg, III |
| 2018/0192000 A1 | 7/2018 | Mercredi et al. |
| 2018/0288467 A1 | 10/2018 | Holmberg et al. |
| 2018/0316939 A1 | 11/2018 | Todd |
| 2018/0330756 A1 | 11/2018 | MacDonald |
| 2018/0365232 A1 | 12/2018 | Lewis et al. |
| 2019/0124159 A1 | 4/2019 | Alsina et al. |
| 2019/0147841 A1 | 5/2019 | Zatepyakin et al. |
| 2019/0155934 A1 | 5/2019 | Delaney et al. |
| 2019/0179610 A1 | 6/2019 | Aiken et al. |
| 2019/0200054 A1 | 6/2019 | Dharmaji |
| 2019/0253742 A1 | 8/2019 | Garten et al. |
| 2019/0303874 A1 | 10/2019 | Yang et al. |
| 2019/0321720 A1 | 10/2019 | Nomura et al. |
| 2020/0029117 A1 | 1/2020 | Kalva et al. |
| 2020/0053312 A1 | 2/2020 | Mukherjee et al. |
| 2020/0112753 A1 | 4/2020 | Stockhammer et al. |
| 2020/0275149 A1 | 8/2020 | Su et al. |
| 2020/0402541 A1 | 12/2020 | Talbot et al. |
| 2021/0001236 A1 | 1/2021 | Srinivasan |
| 2021/0006864 A1 | 1/2021 | Xu et al. |
| 2021/0035559 A1 | 2/2021 | Xu |
| 2021/0037295 A1 | 2/2021 | Strickland |
| 2021/0051034 A1 | 2/2021 | Jonas et al. |
| 2021/0321159 A1 | 10/2021 | Aggarwal et al. |
| 2022/0029825 A1 | 1/2022 | Uhr et al. |
| 2022/0040816 A1 | 2/2022 | Eckel et al. |
| 2022/0066621 A1 | 3/2022 | Appelbaum et al. |
| 2022/0103873 A1 | 3/2022 | Yoshida et al. |
| 2022/0132214 A1 | 4/2022 | Felman |
| 2022/0139383 A1 | 5/2022 | Rose et al. |
| 2022/0141500 A1 | 5/2022 | Du |
| 2022/0166815 A1 | 5/2022 | Gratton et al. |
| 2022/0174357 A1 | 6/2022 | Zavesky et al. |
| 2022/0224659 A1 | 7/2022 | Ghazzal |
| 2022/0248080 A1 | 8/2022 | Strickland |

(56) References Cited

U.S. PATENT DOCUMENTS

| | | | |
|---|---|---|---|
| 2022/0256231 | A1 | 8/2022 | Eniwumide |
| 2022/0377413 | A1 | 11/2022 | Lidaka et al. |
| 2022/0408161 | A1 | 12/2022 | Garten |
| 2023/0147705 | A1 | 5/2023 | Huertas et al. |
| 2023/0247067 | A1 | 8/2023 | Adams et al. |
| 2023/0362461 | A1 | 11/2023 | Marten |
| 2024/0040178 | A1 | 2/2024 | Marten |
| 2024/0064355 | A1 | 2/2024 | Marten |
| 2024/0064356 | A1 | 2/2024 | Marten |

OTHER PUBLICATIONS

PCT/IB2021/057835, Int'l Search Report and Written Opinion, dated Jan. 27, 2022.
U.S. Appl. No. 17/087,815, Non-Final Office Action, dated Feb. 24, 2022.
U.S. Appl. No. 17/376,459, Response to Non-final Office Action, dated Mar. 5, 2022.
U.S. Appl. No. 17/376,459, Non-Final Office Action, dated Dec. 17, 2021.
U.S. Appl. No. 15/788,058, filed Oct. 19, 2017.
"Be anyone and reface anything"—downloaded from the Internet on Nov. 3, 2021 from https://hey.reface.ai/.
A. Colaco, I. Kim and C. Schmandt, "Back Talk: An auditory environment for sociable television viewing," 2011 IEEE Consumer Communications and Networking Conference (CCNC), 2011, pp. 352-356, doi: 10.1109/CCNC.2011.5766489. (Year: 2011).
ATSC Standard: ATSC 3.0 System, Doc. A/300:2019, Sep. 17, 2019.
DeepFace Lab for Windows, downloaded from the Internet on Nov. 3, 2021 from https://deepfacelab.en.softonic.com/.
FACESWAP, downloaded from the Internet on Nov. 3, 2021 from https://faceswap.dev/.
Family Fun with Deepfakes . . . , downloaded from the Internet on Oct. 23, 2021, from https://towardsdatascience.com/family-fun-with-deepflakes-or-how-i-got-my-wife-onto-the-tonight-show-a4554775c011.
PCT/IB2021/057835, Invitation to pay Additional Fees and Preliminary International Search Results.
U.S. Appl. No. 16/706,686, Application as filed Dec. 7, 2019.
U.S. Appl. No. 16/706,686, Non-Final Office Action, dated May 12, 2021.
U.S. Appl. No. 16/706,764, Non-Final Office Action, dated Jun. 10, 2021.
U.S. Appl. No. 16/706,764, Application as filed, Dec. 8, 2019.
U.S. Appl. No. 16/706,764, Non-Final Office Action Response, dated Sep. 7, 2021.
U.S. Appl. No. 16/801,277, Application as filed, Feb. 26, 2020.
U.S. Appl. No. 17/087,815, Application as filed, Nov. 3, 2020.
U.S. Appl. No. 17/336,416, Application as filed, Jun. 2, 2021.
U.S. Appl. No. 17/376,459, Application as filed, Jul. 15, 2021.
U.S. Appl. No. 17/543,886, Application as filed, Dec. 7, 2021.
U.S. Appl. No. 17/543,925, Application as filed, Dec. 7, 2021.
U.S. Appl. No. 15/788,058, Prosecution History through Jul. 19, 2022.
U.S. Appl. No. 16/706,686, filed Dec. 7, 2019, prosecution history.
U.S. Appl. No. 16/706,764, Issue Fee Paid, Jun. 15, 2022.
U.S. Appl. No. 16/706,764, RCE, Jul. 19, 2022.
U.S. Appl. No. 17/336,416, Non-final Office Action, dated Jun. 16, 2021.
U.S. Appl. No. 17/376,459, RCE and Response to Final Office Action, dated Jul. 5, 2022.
U.S. Appl. No. 17/840,966, Application as filed, Jun. 15, 2022.
U.S. Appl. No. 15/788,058, Ntc Appeal with Pre-Appeal Brief Conference Request, dated Sep. 7, 2022.
U.S. Appl. No. 16/706,764, Ntc Allowance, dated Sep. 8, 2022.
U.S. Appl. No. 16/801,277, Non-Final Office Action, dated Aug. 30, 2022.
U.S. Appl. No. 17/087,815, Notice of Allowability dated Sep. 9, 2022.
U.S. Appl. No. 17/087,815, Notice of Allowance dated Sep. 1, 2022.
U.S. Appl. No. 17/336,416, Response to Non-final Office Action, dated Sep. 12, 2022.
U.S. Appl. No. 17/376,459, Non-final Office Action, dated Jul. 29, 2022.
U.S. Appl. No. 16/706,764, Notice of Allowance, dated Mar. 17, 2022.
U.S. Appl. No. 17/087,815, Response to Non-Final Office Action, dated May 23, 2022.
U.S. Appl. No. 17/376,459, Final Office Action, dated May 2, 2022.
U.S. Appl. No. 15/788,058, Request for Continued Examination, Amendment and IDS, dated Nov. 3, 2022.
U.S. Appl. No. 15/788,058, Notice of Allowance dated Nov. 30, 2022.
U.S. Appl. No. 16/801,277, Response to non-final Office Action, dated Nov. 28, 2022.
U.S. Appl. No. 17/376,459, Final Office Action, dated Dec. 1, 2022.
U.S. Appl. No. 17/376,459, Response to Non-final Office Action, dated Oct. 11, 2022.
M. 0. van Deventer, H. Stokking, M. Hammond, J. Le Feuvre and P. Cesar, "Standards for multi-stream and multi-device media synchronization," in IEEE Communications Magazine, vol. 54, No. 3, pp. 16-21, Mar. 2016, doi: 10.1109/MCOM.2016.7432166. (Year: 2016).
U.S. Appl. No. 16/706,764, Prosecution Reopened, Jan. 4, 2023.
U.S. Appl. No. 16/801,277, Final Office Action, dated Dec. 23, 2022.
U.S. Appl. No. 17/336,416, Final Office Action, dated Jan. 9, 2022.
U.S. Appl. No. 17/543,886, Non-Final Office Action, dated Dec. 19, 2022.
U.S. Appl. No. 17/543,925, Non-final Office Action, dated Jan. 31, 2023.
U.S. Appl. No. 16/706,764, Notice of Allowability, dated May 11, 2023.
U.S. Appl. No. 16/801,277, RCE and response to Final Office Action, dated Mar. 21, 2023.
U.S. Appl. No. 17/336,416, RCE and Response to Final Office Action, dated Apr. 4, 2023.
U.S. Appl. No. 17/376,459, Notice of Allowance, dated Apr. 24, 2023.
U.S. Appl. No. 17/376,459, Response to Final Office Action, dated Mar. 29, 2023.
U.S. Appl. No. 17/543,886, Response to Non-Final Office Action, dated Apr. 5, 2023.
U.S. Appl. No. 16/801,277, Notice of Allowance & Interview Summary, dated Jul. 12, 2023.
U.S. Appl. No. 16/801,277, Supplemental Amendment & Interview Summary, dated Jun. 27, 2023.
U.S. Appl. No. 17/336,416, Non-Final Office Action, dated Jul. 28, 2023.
U.S. Appl. No. 17/543,886, RCE and Response to Final Office Action, dated Aug. 21, 2023.
U.S. Appl. No. 17/543,925, Final Office Action, dated Jul. 7, 2023.
U.S. Appl. No. 17/543,925, Notice of Allowance and Examiner Interview Summary, dated Jul. 27, 2023.
U.S. Appl. No. 17/543,925, Response to Final Office Action and eTerminal Disclaimer, dated Jul. 8, 2023.
U.S. Appl. No. 18/094,369, Response to non-final Office Action with Terrminal Disclaimer, dated Aug. 22, 2023.
U.S. Appl. No. 18/222,453, Continuation application as filed, Jul. 16, 2023.
U.S. Appl. No. 17/543,886, Final Office Action, dated May 25, 2023.
U.S. Appl. No. 17/543,925, Non-final Office Action Response, dated May 29, 2023.
U.S. Appl. No. 17/891,939, Examiner Interview Summary, dated Jun. 8, 2023.
U.S. Appl. No. 17/891,939, Amendment and Examiner Initiated Interview Summary, dated May 31, 2023.
U.S. Appl. No. 17/891,939, Notice of Allowance, dated Jun. 8, 2023.
U.S. Appl. No. 18/094,369, Non-Final Office Action, dated Jun. 8, 2023.

(56) References Cited

OTHER PUBLICATIONS

U.S. Appl. No. 16/706,764, filed Dec. 8, 2019.
U.S. Appl. No. 17/376,459, filed Jul. 15, 2021.
U.S. Appl. No. 16/801,277, filed Feb. 6, 2020.
U.S. Appl. No. 18/094,369, Final Office Action, dated Nov. 29, 2023 (Available at Patent Center).
U.S. Appl. No. 18/314,987, Applicant Initiated Interview Summary, dated Nov. 17, 2023, (Available at Patent Center).
U.S. Appl. No. 17/336,416, Non-Final Office Action Response, dated Oct. 23, 2023.
U.S. Appl. No. 17/840,966, Non-Final Office Action, dated Oct. 19, 2023.
U.S. Appl. No. 17/543,886, non-final Office Action, dated Sep. 14, 2023.
U.S. Appl. No. 18/314,987, Non-Final Office Action, dated Sep. 13, 2023.
U.S. Appl. No. 18/484,241, Application filed, dated Oct. 10, 2023.
U.S. Appl. No. 17/336,416, Final Office Action, dated Dec. 22, 2023.
U.S. Appl. No. 17/336,416, Response to Final Office Action, dated Jan. 9, 2024.
U.S. Appl. No. 17/543,886, Response to non-final Office Action, dated Jan. 5, 2024.
U.S. Appl. No. 17/840,966, Response to non-final Office Action, dated Jan. 5, 2024.
U.S. Appl. No. 18/094,369, Final Office Action, dated Nov. 29, 2023.
U.S. Appl. No. 18/222,453, Notice of Publication, Nov. 9, 2023.
U.S. Appl. No. 18/314,987, Applicant Initiated Interview Summary, dated Nov. 17, 2023.
U.S. Appl. No. 18/314,987, Response to Non-Final Ofice Action, dated Dec. 13, 2023.
U.S. Appl. No. 17/336,416, Advisory Action, Jan. 29, 2024.
U.S. Appl. No. 17/336,416, RCE, Jan. 29, 2024.
U.S. Appl. No. 17/336,416, Non-Final Office Action, Feb. 22, 2024.
U.S. Appl. No. 17/543,886, Final Office Action, Feb. 15, 2024.
U.S. Appl. No. 18/094,369, Notice of Allowance, Feb. 14, 2024.
U.S. Appl. No. 18/094,369, Response to Final Office Action, Jan. 27, 2024.
U.S. Appl. No. 18/484,241, Notice of Publication, Feb. 2, 2024.
U.S. Appl. No. 18/314,987, Notice of Allowance, dated Feb. 27, 2024.
U.S. Appl. No. 17/840,966, filed Jun. 15, 2022.
U.S. Appl. No. 18/484,241, filed Oct. 10, 2023.
U.S. Appl. No. 18/094,369, filed Jan. 8, 2023.
U.S. Appl. No. 18/222,453, filed Jul. 16, 2023.
U.S. Appl. No. 17/336,416, filed Jun. 2, 2021.
U.S. Appl. No. 17/543,886, filed Dec. 7, 2021.
U.S. Appl. No. 17/543,925, filed Dec. 7, 2021.
U.S. Appl. No. 17/891,939, filed Aug. 19, 2022.
U.S. Appl. No. 18/363,897, filed Aug. 2, 2023.
U.S. Appl. No. 18/314,987, filed May 10, 2023.

\* cited by examiner

CELL PHONE CONTENT WATCH PARTIES

CROSS-REFERENCE TO RELATED APPLICATIONS

The present application is related to U.S. patent application Ser. No. 17/543,925, co-filed herewith on 7 Dec. 2021, in the name of inventors Neil Marten et al., entitled "Deepfake Content Watch Parties," the entire contents of such application are herein incorporated by reference.

The present application is related to U.S. patent application Ser. No. 17/543,886, co-filed herewith on 7 Dec. 2021, in the name of inventors Neil Marten et al., entitled "Karaoke Content Watch Parties," the entire contents of such application are incorporated herein by reference.

TECHNICAL FIELD

The technology described herein generally relates to devices, systems, and processes for facilitating sharing of video images of participants to a watch party.

BACKGROUND

Today, various systems, methods, and devices have been described which enable multiple, physically remote persons to be presented with content and user reactions thereto, at substantially the same time. Multiple implementations of such systems et al. are described, for example, in U.S. patent application Ser. No. 16/801,277, which was filed on 26 Feb. 2020, in the name of inventor Neil Marten, and is entitled "Devices, Systems and Processes for Facilitating Watch Parties" (the "'277 App."); which is incorporated herein by reference in its entirety. The '277 App. describes, in part, various implementations of watch parties including an implementation where a camera may be focused upon a first user at a first location and images captured by such camera may be then provided for viewing by other users at other locations; such other locations being remote from the location of the first user.

U.S. patent application Ser. No. 16/706,686, which was filed on 7 Dec. 2019, in the name of inventor Ramgopal Madduluri, and is entitled "Devices, Systems and Processes for Providing Engaging Content Environments" (the "'686 App."); the entire contents of which are incorporated herein by reference in its entirety. The '686 App. describes, in part, various implementations by which a first user may share their reactions to content, including visible reactions, with other remote users participating in a "user circle" (as further described in the '686 App.). The '686 App. also describe uses of cameras in a user device or otherwise to capture a user's reactions to content, and for sharing such reactions to others.

U.S. patent application Ser. No. 17/087,815, which was filed on 3 Nov. 2020, in the name of inventors Satish Balasubramanian Iyer, et al., and is entitled "Devices, Systems and Processes for Facilitating Live and Recorded Content Watch Parties" (the "'815 App."); which is incorporated herein by reference in its entirety. The '815 App. describes various implementations for facilitating watch parties and the substantially simultaneous presentation of video capturing a first user's reactions to content with other remote users.

U.S. patent application Ser. No. 17/376,459, which was filed on 15 Jul. 2021, in the name of inventor Neil Marten, and is entitled "Interactive Media Events" (the "'459 App."); which is incorporated herein by reference in its entirety. The '459 App. describes various implementations for facilitating interactive media events.

U.S. patent application Ser. No. 17/336,416, which was filed on 2 Jun. 2021, in the name of inventor Neil Marten, and is entitled "Consolidated Watch Parties" (the "'416 App."); which is incorporated herein by reference in its entirety. The '416 App. describes various implementation for facilitating later arising consolidated presentations of watch parties and interactive media events.

Accordingly, various needs exist for improving watch parties, interactive media events, consolidated watch parties and the like (collectively, each a "watch party") including, facilitating uses of video devices (and other user input/output devices) during a watch party. For example, needs exist for use of video devices that are independent of another system component, such as a set top box, a gaming console, a television or the like facilitating the presentation of content during the watch party, yet communicatively linked thereto to facilitate the capturing and sharing of a user's reactions to content with others during a watch party.

An integration of multiple audio and/or video feeds generated at one or more user locations, such as at a first home, into a combined feed provided to other remote watch party users is needed. An ability to provide enhanced levels of privacy during watch parties is needed. Last, needs exist for watch party users to be able to select which user's reactions to view at a given time during the watch party. The various implementations of the present disclosure address these and other needs.

SUMMARY

Various implementations are described of devices, systems, and processes for facilitating cell phone watch parties.

A system of one or more computers can be configured to perform particular computer instructions using software, firmware, hardware, or a combination of them installed thereon or available thereto. The computer instructions, when executed, cause the system to perform various operations.

For at least one implementation of the present disclosure, the system includes a sync server that further includes a server CPU; a host user device communicatively coupled to the sync server; a client user device communicatively coupled to the sync server; a content capture device (CCD) communicatively coupled to the host user device; and a content provider, communicatively coupled to the host user device and the client user device. The content provider provides primary content segments to the host user device and the client user device. The CCD provides cell phone content to the host user device. The host user device provides the cell phone content to the sync server. The sync server synchronizes a providing of the cell phone content with a presentation of the primary content by the client user device to facilitate substantially simultaneously presentations of the cell phone content on the host user device and the client user device. Other embodiments of this implementation include corresponding computer systems, apparatus, and computer programs recorded on one or more computer storage devices, each configured to perform the operations of the methods.

Implementations of the present disclosure may include one or more of the following features. The primary content may include live content; and the cell phone content includes user image data for a first user. The content provider may include a content distribution network including a host content node and a client content node. The host user device may be communicatively coupled to the host content node. The client user device may be communicatively coupled to one of the client content node. The server CPU may instantiate a server sync engine. The server sync engine may execute first non-transient computer instructions facilitating the synchronization of the providing of the cell phone content to the client user device with a presentation of the primary content by the host user device on a display device, by performing synchronization operations including: determining when a first portion of the primary content is first received, at a first time, by the host user device; determining when the first portion of the primary content is second received, at a second time, by the client user device; determining when a first portion of the cell phone content is provided, by the CCD, to the host user device; determining any delay between the first time and the second time; setting, based on the delay, an adjustment; adjusting by the client user device and based on the adjustment, a client user device presentation of the primary content and the cell phone content; and not adjusting by the host user device, a host user device presentation of the primary content; and where the adjusting facilitates substantially simultaneous presentation of another portion of the primary content by the client user device and the host user device with a substantially simultaneous presentation of another portion of the cell phone content received by the host user device by the client user device.

The adjusting of the client user device presentation of the primary content further may include applying a trick-play mode operation to each the primary content and the cell phone content. The trick-play mode operation may include one of a pause and a seek operation. The synchronization operations further may include determining whether the delay exceeds a delay interval. When the delay exceeds the delay interval, setting the adjustment; and when the delay does not exceed the delay interval, periodically determining whether a current portion of the primary content is being presented substantially simultaneously by the host user device and the client user device. The delay interval may be a predetermined delay of between 100 milliseconds and 1000 milliseconds.

The server CPU may instantiate a server conference engine; where the server conference engine may be further operable to execute second non-transient computer instructions facilitating collaboration between a host user device user and a client user device user by performing conferencing operations including: determining whether a cell phone content segment has been received by the sync server from the host user device; and when received, determining a type of the cell phone content segment. The type of the cell phone content segment may be at least one of an audible signal and a visible signal. The second non-transient computer instructions facilitate operations that may include: identification of a user associated with the cell phone content segment and prioritization of the cell phone content segment based on the identification of the user. The prioritization may include instructing the client user device to present the cell phone content segment during the cell phone watch party. The prioritization may include instructing the client user device to not present the cell phone content segment during the cell phone watch party. The cell phone content may include collaborations arising between a user of the host user device and the client user device; and the server CPU may be further operable to instantiate a server conference engine operable to execute non-transient computer instructions synchronizing the collaborations with the primary content.

The client user device may include an internal output device. The collaborations may be presented to a client user using the internal output device and the primary content may be presented to the client user using a ten-foot device. The host user device further may include: a host user device CPU which instantiates a user device sync engine. The user device sync engine may execute non-transient computer instructions facilitating the synchronization of the cell phone content with a presentation of the primary content by the host user device on a display. The cell phone content may include a cell phone content segment that may be presented on the display and includes user image data superimposed upon a background image. The background image may include at least one primary content segment. Implementations of the described techniques may include hardware, a method or process, or computer software on a computer-accessible medium.

For at least one implementation, a system includes a sync server that may include a server CPU. The server CPU executes non-transient computer instructions for instantiating a server conference engine and a server sync engine. The system also includes a host user device, communicatively coupled to the sync server, which includes a host CPU. The host CPU executes non-transient computer instructions for instantiating a host sync engine. The system also includes a client user device, communicatively coupled to the sync server, which includes a client CPU. The client CPU executes non-transient computer instructions for instantiating a client sync engine. The system also includes a content capture device (CCD) coupled to and outputting cell phone content segments to the host user device. A content provider may include a content distribution network having a host content node and a client content node, where the host content node may be communicatively coupled to the host user device, where the client content node may be communicatively coupled to the client user device. The content provider may be operable to first provide a first portion of a primary content and to second provide a second portion of the primary content to the host user device and the client user device, where the providing of the first portion of the primary content occurs separately of the second providing of the second portion of the primary content. The system may also include an implementation where the sync server, the host sync engine and the client sync engine cooperatively synchronize the second providing of the second portion of the primary content to the client user device with a providing of a second segment of the cell phone content segments to facilitate substantially simultaneously presentations of the second portion of the primary content by the host user device and the client user device with the second segment of the cell phone content segments received by the host user device and communicated to the client user device via the sync server.

Implementations may include one or more of the following features. The server CPU may instantiate a server conference engine. The host CPU may instantiate a host conference engine. The client CPU may instantiate a client conference engine. The server conference engine, the host conference engine, and the client conference engine may cooperatively synchronize a collaboration arising between the host user device and the client user device with the presentations of the second portion of the primary content and the second segment of the cell phone content segments by the host user device and the client user device. Implementations of the described techniques may include hardware, a method or process, or computer software on a computer-accessible medium.

One implementation of the present disclosure includes a method for facilitating cell phone content watch parties. The method may include inviting, by a host user device, a client user device to attend a cell phone watch party, receiving an acceptance from the client user device and designating the client user device as a participating client user device. The watch party may be facilitated by a sync server communicatively coupled to the host user device and the participating client user device. The method may include operations including: accessing primary content, from a content provider, by the host user device and the participating client user device; associating, by the host user device, a host time of receipt for a given segment of the primary content and outputting host sync data reflective thereof to the sync server; determining, by the participating client user device, a client time of receipt for the given segment of the primary content and outputting client sync data reflective thereof to the sync server; determining, by the sync server, any delay arising in the host time of receipt and the client time of receipt, as provided by the host sync data and the client sync data; and adjusting a presentation of a second segment of the primary content by the client user device based upon the determined delay. Upon adjustment, the second segment of the primary content and a cell phone content segment received by the host user device and provided to the client user device may be presented substantially simultaneously by the client user device with a presentation of the second segment of the primary content by the host user device. Other embodiments of may include corresponding computer systems, apparatus, and computer programs recorded on one or more computer storage devices, each configured to perform the operations of the methods.

Implementations may include one or more of the following features. The method may include: determining whether the cell phone content includes audible signals; and synchronizing the presenting of the cell phone content with the presenting of the primary content during the cell phone watch party; and where the synchronizing of the presenting of the cell phone content with the presenting of the primary content during the cell phone watch party includes reducing a volume setting for the primary content while the cell phone content includes the audible signals. Implementations of the described techniques may include hardware, a method or process, or computer software on a computer-accessible medium.

BRIEF DESCRIPTION OF THE DRAWINGS

The features, aspects, advantages, functions, modules, and components of the devices, systems and processes provided by the various implementations of implementations of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

DETAILED DESCRIPTION

Figure 1:
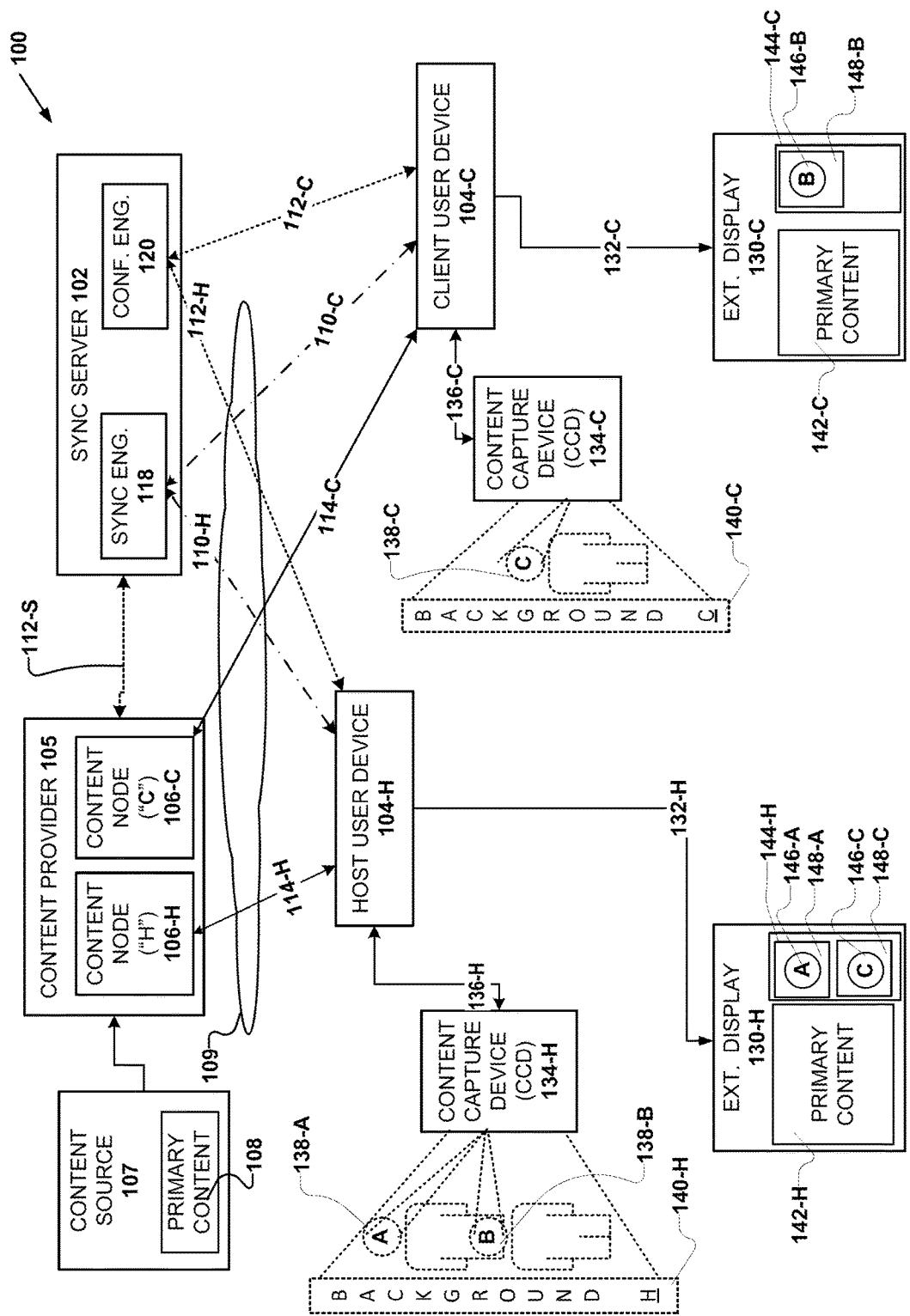
FIG. 1 is a schematic illustration of a system for facilitating cell phone watch parties and in accordance with at least one implementation of the present disclosure.

Various implementations of the present disclosure describe devices, systems, and processes for facilitating cell phone watch parties.

A "cell phone content watch party" is a "substantially simultaneous" presentation of "primary content" and "cell phone content" to two or more "separate" users, where the secondary content includes video and/or audio content captured by a user a/v recording device, such as a smartphone camera, a web camera, or otherwise that is selectively processed in view of one or more preferences for a given watch party and/or in view of one or more user preferences. A cell phone content watch party may include features and functions provided by one or more of a Watch Party (as described, e.g., in '277 App., the '686 App., and the '815 App.), a Consolidated Watch Party (as described, e.g., in the '416 App.), an Interactive Media Event (as described, e.g., in the '459 App.), or the like.

A "computer engine" (or "engine") refers to at least one of a dedicated hardware, such as an application specific integrated circuit (an "ASIC"), a combination of hardware with specially purposed computer instructions, a combination of general purpose hardware, such as a central processing unit ("CPU") and non-volatile "computer instructions" (as defined below) configured to facilitate various actual and/or logical features and functions (herein, each a "logic").

"Content" refers to any information that may be presented, using a suitable presentation device, to a user in a humanly perceptible format. Non-limiting examples include videos, television programs, audio programs, speeches, concerts, gaming images and graphics, or otherwise. Content may include, for example and not by limitation, one or more of sounds, images, video, graphics, gestures, or otherwise. The content may originate from any source, including live and/or recorded, augmented reality, virtual reality, computer generated, or otherwise. The content may be presented to a given user using any desired "user device" (as described below). Content may be made available by a producer, publisher, distributor, or other source of such content. For example, a producer for a new television series may initiate a cell phone content watch party available to select, all, or other combinations of user devices. Cell phone watch parties may be used for promotional purposes. Cell phone watch parties may also be used for any other desired, lawful purpose; non-limiting examples including gambling, sporting contests, shopping, educational and training, cooking, or otherwise. For at least one implementation, cell phone watch parties may be used for sporting contests, such as MARCH MADNESS, the OLYMPICS, the WORLD CUP, FORMULA 1 races, or otherwise to facilitate common viewing of real-time content of particular interest to one or more users. For example, last minute action in a basketball game may be presented to multiple users during a watch party.

Content may be stored, transmitted, processed or otherwise manipulated in non-humanly perceptible formats that may be converted, by known and later arising devices, systems and methods, into humanly perceptible information presented by a suitable presentation device. Current implementations of such presentation devices are well known any suitable known or later arising presentation device may be used for content presentation to users.

"Primary content" is content provided by a "content source" (as described below) for presentation to multiple users using one or more "user devices" (as described below). Primary content may have any form, format, length, duration, or the like.

"Secondary content" is content provided by another entity, such as a user, an artificial intelligence, or otherwise in reaction, response, based upon, or otherwise (herein, "responsive") in view of a given primary content and/or another secondary content. Secondary content may include one or more user "reactions" (as described below) to primary content and/or to other reactions. Secondary content may include other information, generated by any entity, such as statistics, background information regarding primary content, information regarding a reaction, or otherwise. Secondary content may be captured and presented in any format, non-limiting examples including audio/video formats, text based formats, and otherwise. Secondary content may be humanly perceptible or imperceptible. For an implementation, secondary content may include reactions captured as "chat data" (as described below).

A "content segment" is a delineable portion of primary content or secondary content. For a non-limiting example, a primary content may include audio and video for an entire football game. A content segment may include the audio and video for a given scoring play for the football game.

A "reaction" is a response by a user to primary content and/or secondary content. The reaction may be to all, or one or more primary content segments and/or secondary content segments. A reaction may be imperceptible to others, for example, an elevated heart rate of a given user. A reaction may be perceptible to others, for example, an outburst of sounds, motion (e.g., hand waving), or otherwise by a given user. A reaction may be ephemeral, ongoing, or otherwise.

A "cell phone reaction" is a subset form of a reaction. A cell phone reaction is captured as "cell phone content" (a subset of secondary content) by a user's "content capture device" (CCDs) (as described below). Cell phone content includes video data and may optionally include audio data. Non-limiting examples of CCDs include cameras and microphones on smart glasses, smartphones, tablets and the like, body cameras such as GOPROS and the like, drone cameras, video cameras, and the like. A cell phone reaction may occur by a user in response to a primary content. For example, a first user cheering a goal being scored in a football game may be captured by a CCD and provided a cell phone content. One or more prior cell phone reactions may occur with respect to any given primary content, secondary content and produced as distinct, consolidated, combined, or in other forms as one or more cell phone reactions.

"Cell phone content timing" is information that facilitates synchronization of a cell phone content segment with a given primary content segment and/or a secondary content segment.

A cell phone reaction may be captured by a CCD and presented to other cell phone content watch party users on a "live," "delayed" or "recorded" basis (as defined below). When presented to other users on a non-live basis, a user cell phone reaction is referred to herein as a "later cell phone reaction," which is a subset of a later reaction.

A cell phone reaction may be second captured and recorded and communicated to a server for additional storage and/or processing. Based on the media event data, a cell phone reaction may be synchronized by a server, user device, combination thereof, or otherwise with one or more reactions and/or other cell phone reactions and with a given primary content (or segment thereof) so as to be later presentable to a user in synchronization with a presentation of a recorded primary content (or segment thereof) and one or more recorded prior reactions.

"Media event" refers to a combination of "primary content" and "synchronization information" (as described below) for such primary content.

"Synchronization information" includes information which identifies a given point in time relative to a beginning and/or end of a given primary content, or a segment thereof. Non-limiting examples of "synchronization information" include audio/video ("A/V") frame synchronization data, universal time code data, content based data, metadata associated with a given content, or otherwise.

"Live" refers to a transmission and presentation of content to two or more users that occurs at or within one minute of a first availability of such content for presentation to such two or more users.

"Recorded" refers to content first available to two or more users and where such content is delayed and/or later presented to two or more users more than one minute after the first availability of such content, such as, on an on-demand, time delayed, or other basis.

"Delayed" and "delay period" refer to a period of time after a given live presentation of a primary content during a cell phone content watch party. A delay and commiserate delay period may occur after any given period. The delay period may occur for a pre-determined, dynamically determined, or otherwise determined period. For at least one implementation, a given delay period may be less than one second (1 sec) after a given live presentation of a primary content segment during a cell phone content watch party. For another implementation, a given delay period may be determined based on a quantification of one or more networked communications characteristics occurring during a given cell phone content watch party. For a non-limiting example, a given delay period may be determined, dynamically or otherwise, based on an average network latency for one or more user devices attending a given media event, a worst-case latency for a given user device attending the cell phone content watch party, based upon bandwidth constraints, data processing constraints of one or more user devices, or otherwise. A delay period may include a waiting period that ends upon a conclusion of a given live presentation of primary content during a cell phone content watch party. A delay period may end after a live sporting event concludes. A delay period may include a waiting period that ends upon a conclusion of a given presentation of a live or recorded primary content segment.

"Real-time" refers to a presentation of a primary content segment and secondary content where such presentation occurs substantially simultaneously based upon when such primary content segment is first available for presentation to a user, via a user device, such as at the time of the primary content segments first generation. A "real-time" presentation may include a primary content segment being presented on a live or on a recorded basis to one or more users via a compatible presentation device (such as a television or video display), after a given delay period (for example, a two-second delay period), or otherwise. For a non-limiting example, a cell phone content watch party of a football match captured and presented as one or more primary content segments and one or more cell phone content segments occurs "real-time" when one or more users may view the primary content and the cell phone content, using a television or other content presentation device, at substantially the same time (while accounting for data processing and transmission delays and other delay periods) as a spectator, in a viewing stands, could view the match.

"Separately," when referring to two or more users participating in a cell phone content watch party, means a first user may be physically or virtually separated from one or more second users such that each user is uniquely and independently provided a given content, such as a primary content provided by a content provider. Such separation may include a geographic separation, wherein a first user is in a different room, building, city, state, or country than one or more second users. A separation may occur virtually, such as when a first user receives the content and/or reaction(s) as presented, in whole or in part, in a first format (such as an audible portion of the football game in a first language), while a second user receives content and/or reactions in a second format (such as the audible portion of the football game being provided in a second language). For at least one implementation, separation may occur one or more of geographically and virtually.

"Collaboratively" means that a given users cell phone reaction to the live and/or recorded content may be captured and shared with each other user participating in the cell phone content watch party substantially simultaneously (as described below) with the user's actual reaction.

"Substantially simultaneous" means without incurring a humanly perceptible delay between a first event or condition, such as a presentation of a primary content, and a second event or condition, such as a presentation of secondary content, to two or more users using their respective user devices.

A cell phone content watch party may include the presentation of audio and video, for a given primary content and/or secondary content, to users with "low latency" and at "high quality." As used herein, "low latency" means a transmission of content from a source to a user device with less than a one second delay between the time of transmission of the content by the source and reception of such content by the user device. As used herein, "high quality" when referring to audio-video (A/V) content (for example and not by limitation) means that the content is transmitted by a content source directly, for example using a direct satellite connection, or indirectly, for example, using a network, to a user device at three or more megabytes per second (3 MBPS), at a video resolution equal to or greater than the 720p "high definition television" ("HDTV") standard. For at least one implementation, high quality may include the use of adaptive bit rate ("ABR") transmission technologies. Such ABR technologies may be configured to provide content at a "low latency" while using a varying video resolution over time. In contrast, "medium quality" means AV content that is transmitted by a content source to a user device at a "standard definition television" (SDTV) standard.

"(In)directly" means that a transmission of a given content from a source to a given user device may be direct, such as occurs with radio and satellite broadcast television signals, or indirect, such as occurs with streaming and over-the-top (OTT) transmissions. Indirect transmissions may include use of various network technologies, including "Cloud" technologies.

"Cloud" refers to cloud computing, cloud storage, cloud communications, and/or other technology resources which a given user does not actively manage or provide. A usage of a Cloud resource may be private (limited to certain users and/or uses), public (available for many users and/or uses), hybrid, dedicated, non-dedicated, or otherwise. It is to be appreciated that implementations of the present disclosure may use Cloud resources to provide for processing, storage and other functions related to facilitating live cell phone watch parties.

"Module" recites definite structure for an electrical/electronic device that is configured to provide at least one feature and/or output signal and/or perform at least one function including the features, output signals and functions described herein. Such a module may provide the one or more functions using hardware components, such as digital signal processors, application specific integrated circuits, general use processors, central processing units (CPUs), dedicated electrical circuits, or otherwise. When a feature, output signal and/or function is provided, in whole or in part, using a processor, one more software components may be used and a given module may be include a processor configured to execute computer instructions (as defined below). A person having ordinary skill in the art (the "PHOSITA") will appreciate that the specific hardware utilized and/or computer instructions used will depend upon the functions to be accomplished by a given module. Likewise, a PHOSITA will appreciate that such computer instructions may be provided in firmware, as embedded software, provided in a remote and/or local data store, accessed from other sources on an as needed basis, or otherwise. Any known or later arising technologies may be used to provide a given module and the features and functions supported therein.

Cell Phone Content Watch Party System 100

As shown in FIG. 1, a system 100 for facilitating a cell phone content watch party may include a sync server 102. The sync server 102 may be communicatively coupled by a communications network 109, such as one that utilizes in whole or in part the Internet, a Cloud, or otherwise, to each of two or more user devices 104, such as one or more host user devices 104-H and one or more client user devices 104-C, using sync links 110-H/C and conference links 112-H/C.

Two or more user devices 104 may be communicatively coupled to at least one content node 106. A content node 106 may be associated with a content provider 105 that receives primary content 108 from a content source 107. Such communicative coupling of a user device 104 with a content node 106, such as content nodes 106-H and 106-C may include use of content links 114, such as a host content link 114-H and a client content link 114-C. A user device 104 may be separately coupled to a content node 106 by a content link 114. More than one user device 104 may be coupled to a given content node 106.

A user device 104 may be coupled to one or more content capture devices (CCD) 134, such as a host CCD 134-H and to a client CCD 134-C. Non-limiting examples of CCDs include video cameras and microphones as provided on electronic devices, where non-limiting examples include smartphones, tablet devices, laptop computers, video cameras, and the like. CCDs 134 may be configured to capture cell phone reactions such as a user image data 138. CCDs 134 may capture background content and provide the same as a background image data 140. The user device 104 may be coupled to a given CCD 134 using an CCD link 136, such as a host CCD link 136-H or a client CCD link 136-C. For a non-limiting example, an image of user's head or face, such as those for a first user "A" a second user "B" or a third user "C" may be provided as respective first user image data 138-A, second user image data 138-B and third user image data 138-C. Further, one or more background images 140, such as a host background image data 140-H or a client background image data 140-C, may be captured by one or more CCDs 134 and provided to a user device 104 for further data processing, storage, and the like. A CCD 140 may be configured to capture any desired form or forms of cell phone content including in an audio and/or video form.

Sync Server 102

Figure 2:
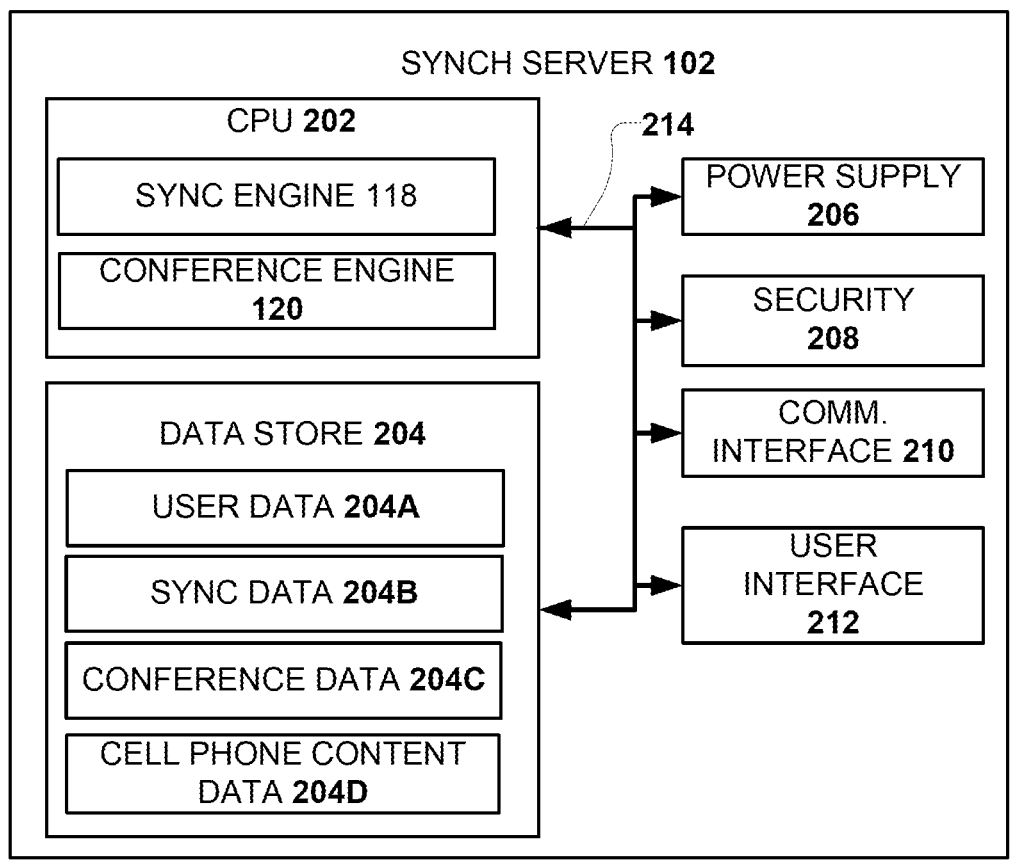
FIG. 2 is a schematic illustration of synch server for facilitating cell phone watch parties and in accordance with at least one implementation of the present disclosure.

As shown in FIGS. 1 and 2, the sync server 102 may include two or more "computer engines" including a "server synch engine" 118 and a "server conference engine" 306. One or more of the logics may be combined, included, not included, distributed across one or more servers 102 and/or provided by one or more engines. It is to be appreciated that engines may be provided separately, collectively, or otherwise by one or more correspondingly configured physical devices, systems, and/or collection of devices and systems.

Server CPU 202

A sync server 102 may include a server central processing unit (CPU) 202 or similar electrical data processing device. Any known or later arising CPU may be used. The server CPU 202 may be provided by any local processing device capable facilitating one or more logics by executing one more non-transient computer executable instructions (herein, each a "computer instruction"). One or more of the server engines such as the server sync engine 118 and the server conference engine 306 may be executed by one or more threads on a CPU, or otherwise.

The server CPU 202 may include one or more physical components configured for such data processing operations. For at least one implementation, the server CPU 202 may include one or more hardware processors, such as 32-bit and 64-bit central processing units, multi-core ARM based processors, microprocessors, microcontrollers, and otherwise. The computer instructions may include instructions for executing one or more applications, software engines, and/or processes configured to perform computer executable operations. Such hardware and computer instructions may arise in any desired computing configuration including, but not limited to, local, remote, distributed, blade, virtual, or other configurations and/or systems configured for use in support of the one or more implementations of the present disclosure. Any known or later arising technologies may be utilized in conjunction with an implementation of the present disclosure to facilitate the server CPU 202, the server sync engine 118, and/or the server conference engine 306.

A server may instantiate one or more computer engines as a thread operating on a computing system having a multiple threaded operating system, such as the WINDOWS 10 operating system, LINUX, APPLE OS, ANDROID, and others, as an application program on a given device, as a web service, or otherwise. An Application Program Interface (API) may be used to support an implementation of the present application. A server 102 may be provided in the virtual domain and/or in the physical domain. A server 102 may be associated with a human user, a machine process executing on one or more computing devices, an API, a web service, instantiated on the Cloud, distributed across multiple computing devices, or otherwise. A server 102 may be any electronic device configurable to communicate data using a network, directly or indirectly, to another device, to another server, or otherwise.

The server CPU 202 may be communicatively coupled, by a server data bus 214 or similar structure, to other components of the server 102 including, but not limited to, a server data store 204, which may also be referred to as a "computer readable storage medium."

Server Sync Engine 118

A server sync engine 118 may be configured to manage synchronization of cell phone content with primary content and secondary content during a cell phone content watch party. Status information regarding the communication of cell phone content from a user device 104 may be provided to the sync server 102 and server sync engine 118 using the two or more sync links 110.

The server sync engine 118 may be configured to facilitate synchronization of primary content, secondary content, and cell phone content by designating a given user device 104 as a "host" user device 104-H, while designating one or more remaining user devices participating in a given cell phone content watch party as a "client" user device 104-C. A user device 104 initiating a cell phone content watch party may be automatically or otherwise designated as the host user device 104-*h*. A given user device 104 participating in a cell phone content watch party may be designated as the host user device 104-H at any time during the cell phone content watch party. Such designation may occur, for example, when a user device 104 previously designated as the host user device drops out of the cell phone content watch party for any or no reason including, but not limited to, technical difficulties or otherwise.

The server sync engine 118 may be configured to designate another user device, such as client user device 104-C, as the host user device. For example, and not by limitation, as when a prior host user device 104-H is no longer participating in a given cell phone content watch party, a client user device 104-C may be redesignated as the host user device 104-H for the cell phone content watch party. An active host user device 104-H and/or the host user device which initiated the cell phone content watch party (the "initiating user device") may designate one or more client user devices 104-C as each being a "presenter."

When designated as a presenter, a client user device 104-C may be configured to include the one or more cell phone content watch party capabilities of a host user device 104-H; such capabilities may become active when a host user device 104-H is no longer present during the cell phone content watch party, as designated by a then active and/or the initiating user device 104-H (e.g., by a passing of control from a then active host user device 104-H to a presenter configured client user device 104-C), or otherwise. Fail-over and other designation rules may be established and provided by computer instructions for governing if and when a re-designation of a client user device 104-C as a "presenter" and/or as a host user device 104-H is to occur for a cell phone content watch party. A user device 104 designated as a host user device 104-H may be configured to identify which user images 138 to then display at any given time during a cell phone content watch party on one or more internal displays 330 and/or external displays 130.

For an implementation, a single user device 104 may be designated as the host user device 104-H, at any given time, during a cell phone content watch party, with other user devices being designated as client user devices 104-C. An initiating user device and/or a then active host user device 104-H may designate a given client user device 104-C as a "presenter" at any given time. Such privileges may also be revoked, transferred, or otherwise designated, at any time, by the then active host user device and/or by the initiating user device. When the host user device 104-H is disconnected from the cell phone content watch party, the server sync engine 118 may be configured to immediately, after an elapsing of a pre-determined period, after an elapsing of a then determined delay period, or based on some other period, event, or otherwise, suspend, and/or cancel, the cell phone content watch party until a host user device 104-H (which may be the initiating user device or a designated presenter) is able to rejoin or continue the cell phone content watch party in a host user device capacity.

A cell phone content watch party may be established with respect to a given cell phone content. For an implementation, multiple cell phone watch parties may be established with respect to a given primary content. A given user device 104 may be configured to participate in such multiple cell phone watch parties, and the sync server 102 may be configured to monitor and identify user devices 104 participating in a given cell phone content watch party at a given time. A cell phone content watch party may include a subset of user devices otherwise participating in a collection of cell phone watch parties for a given event.

A given user device 104 may be designated by a sync server 102 as a host user device 104-H for multiple cell phone watch parties. For example, a professional sports league, such as the NFL, may be designated as an initiating user device, while a team may be designated as a host user device for a live and/or recorded presentation of a sporting event, with multiple cell phone watch parties being established for multiple users of disparate locations, interests, languages, or otherwise.

The server sync engine 118 may be configured to facilitate synchronization of presentation of the cell phone content on user devices 104 based upon "content timing information" provided by a designated host user device 104-H to the server sync engine 118 and thereby to each client user device 104-C, for a given cell phone content watch party. Such content timing information may be provided on any desired periodicity by the host 104-H to the server sync engine 118.

Cell phone content timing information may be based upon a time at which the primary content segment is received by a given user device, such as the host user device 104-H, and a time at which the cell phone content segment is captured by a host CCD 134-H coupled to the host user device 104-H.

A standardized time designator, such as a universal time code ("UTC"), may be used for the content timing information and determining a timing relationship between a primary content segment and a cell phone content segment. A given UTC time may be uniquely associated with an identifiable portion of a primary content segment, as such when a given primary content segment is received by the host user device 104-H, an identifiable portion of a cell phone content segment, such as when captured by a host CCD 134-H, or otherwise. A non-limiting example of a uniquely identifiable portion of a primary content segment includes a frame of A/V content capable of being independently rendered by a user device 104, such as an "I" frame in a motion pictures expert group ("MPEG") group of pictures ("GOP"). For at least one implementation, MPEG compression algorithms and the like may be used for identifying frames of cell phone content, as captured by a CCD 134.

A server sync engine 118 may be configured to periodically receive cell phone content timing information from the host user device 104-H and based thereon determine timing relationships between a given content and a given cell phone content. Such timing relationship may vary over time. The server sync engine 118 may be configured to receive cell phone content timing information periodically from one or more client user devices 104-C and thereon determine timing relationships. Timing relationships may vary over time.

The server sync engine 118 may be configured to receive cell phone content timing information from the host user device 104-H on a different periodicity than cell phone content timing information is received from one or more client user devices 104-C. A server sync engine 118 may be configured to receive cell phone content timing information from any given user device 104 participating in a given cell phone content watch party on any basis, periodicity, or otherwise.

The server sync engine 118 may be configured such that a given cell phone content segment, as communicated to each of the two or more client user devices 104 participating in a given cell phone content watch party, occurs on a real-time or other basis. For example, latency, user device delays, and/or other issues arising with the communication, processing, and/or presenting of a cell phone content segments and/or other content segments by a given client user device may be addressed (if addressable) such that the presentation of future arising given cell phone content segments occurs substantially simultaneously on a given client user device 104-C with respect to a presentation thereof on a host user device 104-H. The server sync engine 118 may be configured to facilitate synchronization of cell phone content segments such that presentation thereof occurs substantially simultaneously across two or more user devices 104 participating in a given cell phone content watch party.

The server sync engine 118 may be configured to adjust presentations of cell phone content segments by one or more client user devices 104-C, in view of cell phone content timing information provided by the host user device 104-H and/or by a client user device 104-C. Such adjustments may occur so that the presentation of a primary content segment by a user device 104 is at one or more of a preferred quality setting, a minimum quality setting, a maximum quality setting, or otherwise.

The server sync engine 118 may be configured to use sync data 204B including, but not limited to, content timing information provided by one or more user devices 104. Sync data 204B may also include computer instructions used to facilitate synchronization of content presentation during a cell phone content watch party. Non-limiting examples of sync data 204B may include communications sockets used by user devices to connect with a content provider 105 and/or a content node 106, IP addresses for user devices, user device identifiers, such as MAC addresses, communications network settings used for one or more of the content links 114, sync links 110, and otherwise. The server sync engine 118 may be configured to use user data 204A to a facilitate synchronization of content during a cell phone content watch party. Non-limiting examples of user data 204A include user demographic information, user device information such as capabilities, technologies supported, and the like, user preferences, user viewing histories, and the like.

A sync link 110 used at a given time during a cell phone content watch party may physically and/or virtually change for any reason, such as when a physical or virtual location of a given user device 104 changes and/or one or more properties of a CCD link 136 changes. For example, a user device 104 may connect to a first watch party from a home location using a high-speed Internet connection. During a second watch party, such user device 104 may connect thereto using a 4G cellular connection. Similarly, a CCD 134 may change location as a user moves throughout a house or otherwise. Such changes in location, connections, network properties, or otherwise may result in a decrease or increase of one or more characteristics of a CCD link 136, such as bandwidth used, latency, signal interference, or otherwise. Such change may impact cell phone content timing information. Accordingly, it is to be appreciated that sync data 204B determined and stored and the frequency of such determining and storing may vary based upon one or more characteristic of communications links used by a given user device 104 to connect to a cell phone content watch party. Such sync data 204B may be used by the sync server 102 in initially configuring the sync link 110 between the sync server 102 and a given user device 104 and in reconfiguring, such as by adjusting a bitrate utilized, the sync link 110 used, or other connection parameter during the cell phone content watch party to facilitate substantially simultaneous presentation of content to multiple users during a cell phone content watch party.

Server Conference Engine 306

A server conference engine 306 may be configured to facilitate collaboration by and between users, via their respective user devices 104, during a cell phone content watch party. Two or more conference links 112 may be established during a cell phone content watch party. Conference links 112 may be provided separate of the sync links 110 or provided jointly therewith.

Synchronization of and collaboration by and between users (via their respective user devices 104) during a given cell phone content watch party may be decoupled from one or more of a providing of primary content (by the content nodes 106 to the user devices 104) and/or any synchronization of content presentations, as facilitated by the server conference engine 306. A providing of cell phone reactions by and between user devices 104 may arise independently and be shared independently of other cell phone content watch party features and/or functions.

A server conference engine 306 may be configured to support collaboration between users during a cell phone content watch party, via their respective user devices 104 and CCDs 134, in any humanly perceptible format; non-limiting examples including speech, video, text, emoticons, gestures, or otherwise. Conference links 114 and collaborative aspects of a cell phone content watch party may be established or unestablished at any time before, during, or after a given cell phone content watch party has been initiated.

A server conference engine 306 may be configured to leverage proprietary, custom, open source, or otherwise provided conferencing software applications including, but not limited to, JITSI MEET, WEBEX, ZOOM, and otherwise.

A server conference engine 306 may be configured to utilize conference data 204C provided by server data store 204. Conference data 204C may include any data and/or computer instructions which facilitate collaboration during a cell phone content watch party. Non-limiting examples of conference data 204C include communications sockets used by user devices, IP addresses for user devices, user device identifiers, such as MAC addresses, communications network settings used for one or more conference links 112 and otherwise. The server conference engine 306 may be configured to use user data 204A to a facilitate collaboration during a cell phone content watch party.

Various conference data 204C may be stored in the server data store 204 and used by the server conference engine 306 in facilitating collaboration during a cell phone content watch party. Non-limiting examples of such conference data 204C include type of connection, distance of user device from sync server 102, maximum available bandwidth for a given conference link 112, throughput for the conference link 112, latency, and other data. Conference data 204C may be provided for each conference link 112-H/C used during a cell phone content watch party.

A server conference engine 306 may be configured to store user communications during a given cell phone content watch party in the server data store 204 as conference data 204C. Such conference data may be time stamped and/or otherwise synchronized with respect to a given primary content segment such that a later playback of the conference data and/or the given primary content segment may include the conference data corresponding to such given primary content segment, as such conference data was generated during the given cell phone content watch party. For example, a later viewing of the football program and a cell phone content watch party by an Nth user may include a presentation of the conference data arising between a host user device 104-H and a client user device 104-C during a prior arising cell phone content watch party. Such later synchronization and presentation of conference data 204C may enable the user of the Nth client of a client user device 104-C to enjoy the prior arising cell phone content watch party later as if participating real-time even though such given cell phone content watch party occurred earlier.

A sub-conference link (not shown) may be provided as a sub-stream of the conference link 112. Data communicated over the sub-conference link may be adaptively bit-rate provided to the various users in a cell phone content watch party such that each user receives a given user's cell phone reaction at substantially the same time the user so reacted. For example, a video camera focused upon a first user of a host user device 104-H may adaptively bit-rate stream images (and audio) of such first user to other second user's client user devices 104-C. The cell phone reactions of the first user, as presented to the second users, may be adaptively bit-streamed processed so as to be in substantially simultaneous synch with the presentation of the given primary content segment that resulted in the given cell phone reaction. A subconference link may be configured to utilize higher speed communications links than are used to facilitate one or more of the conference links 112 such that cell phone reactions to primary content segments may be in substantially simultaneous synchronization with the content segment during a cell phone content watch party. Subconference links and/or conference links 114 may be provided using networks supporting high band 5G communications.

A server conference engine 306 may be configured to adaptively identify, using artificial intelligence, machine learning, and the like which of multiple user images 138 being captured by one or more CCDs 134 to provide to other user devices, such as a client user device 104-C, during a cell phone content watch party. For example, an image of user A's face 138-A, as captured, e.g., by a host CCD 134-H may be identified by a server conference engine 306 as including cell phone content segments that are to be communicated to one or more selected (including perhaps all) client user devices 104-C during one or more portions of a cell phone content watch party. For another example, an image of user B's face 138-B, as captured, e.g., by a host CCD 134-H, may be identified by a server conference engine 306 for communication to other user devices, such as one or more client user devices 104-C, when a primary content segment satisfies one or more criteria. For example, a non-limiting criteria may include user B's image 138-B being communicated when a first team scores a goal as identified in a given primary content segment; another non-limiting criteria may be a given facial expression, such as when user B is speaking, grimacing, or otherwise; another non-limiting criteria may be based upon other secondary content, such as a noise, an indication of an event happening proximate to a given user, or otherwise.

A server conference engine 306 may be configured to modify one or more aspects of a given user image data 138 and/or a given background image data 140. For example, a user image data 138 may include a logo of clothing manufacturer. Image portions (e.g., pixels) corresponding to such logo may be modified when the clothing manufacturer does not meet a given criteria—such as being a recognized promotor or sponsor of a given primary content, or otherwise. For example, a football match sponsored by NIKE may result in the server conference engine 306 obscuring logos presented in a user image data 138 for other sponsors, such as ADDIDAS. A server conference engine 306 may be configured to utilize artificial intelligence and/or machine learning to identify content to be obscured or otherwise modified for presentation to other user devices 104 during cell phone content watch party. For example, cell phone content segments containing abusive, offensive, pornographic, suggestive, violent, fakes, or other types of content may be identified by the server conference engine 306 as being inappropriate and not provided to one or more user devices 104. For further example, user devices associated with a child may be precluded from receiving certain cell phone content segments, while user devices associated with an adult may not be so precluded.

For an implementation, a server conference engine 306 may be configured to modify one or more aspects of a given user image data 138 and/or of a given background image data 140 based upon any parameter or condition. For example, a user using a CCD 134 to capture their image while they travel about their house may desire for background images depicting their home and its contents not be provided to other user devices 104 during a cell phone content watch party. Essentially, a "green screen" or the like may be virtually provided such that any such background images are replaced by another background image—such as a static background image. For an implementation, a background image data 140 may be replaced with one or more primary content segments, including primary content segments containing motion video or static images. For another implementation, a server conference engine 306 may be configured to modify one or more aspects of a background image data 140 and a user's image 138 in relation thereto. For example, a given user's image 138 may be superimposed on a given background image data 140.

A server conference engine 306 may be configured to use artificial intelligence and/or machine learning, in conjunction with user data, to identify and/or prioritize user images 138 to be provided to other user devices 104 during a cell phone content watch party. For example, an image of a coach, may be prioritized for providing to other user devices 104 over an image of a bench warmer, a retired participant, a fan, and/or a non-participant in a given sporting event being presented in one or more primary content segments during a cell phone content watch party.

Server Data Store 204

The server data store 204 may be a single storage, multiple storages, or otherwise. The server data store 204 may be configured to store user data 204A, sync data 204B, conference data 204C, cell phone content data 204D, and other data. The server data store 204 may be provided locally with the sync server 102 or remotely, such as by a data storage service provided on the Cloud, and/or otherwise. Storage of data, including but not limited to user data 204A, sync data 204B, conference data 204C, cell phone content data 204D, and other data may be managed by a storage controller (not shown) or similar component. It is to be appreciated such storage controller manages the storing of data and may be instantiated in one or more of the server storages 204, the server CPU 202, on the Cloud, or otherwise. Any known or later arising storage technologies may be utilized in conjunction with an implementation of the present disclosure to facilitate the server data store 204.

Any known or later arising storage technologies may be utilized for the server data store 204. Non-limiting examples of devices that may be configured for use as data store 204 include electrical storages, such as EEPROMs, random access memory (RAM), Flash drives, and solid-state drives, optical drives such as DVDs and CDs, magnetic storages, such as hard drive discs, magnetic drives, magnetic tapes, memory cards, such as Compact Flash (CF), Secure Digital (SD) cards, Universal Serial Bus (USB) cards, and others.

Available storage provided by the server data store 204 may be partitioned or otherwise designated by the storage controller as providing for permanent storage and temporary storage. Non-transient data, computer instructions, or other the like may be suitably stored in the server data store 204. As used herein, permanent storage is distinguished from temporary storage, with the latter providing a location for temporarily storing data, variables, or other instructions used for a then arising data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store either, if not both, transient and non-transient computer instructions, and other data.

Cell phone content data 204D may include segments of cell phone content that corresponds to a given primary content. One or more cell phone content segments may be stored on the sync server 102, one or more user devices 104, and/or the Cloud. For at least one implementation, a content link 112 may be used to provide cell phone content data to the sync server 102 from a content node 106.

A sync server 102 may include information identifying segments of content that are stored on one more user devices 104. Such content segments are referred to herein as "pre-cached content." Non-limiting examples of pre-cached content may include commercials, segments of non-live programs, or otherwise. Pre-cached content may be used by a sync server 102 to facilitate a cell phone content watch party by providing ready access to the content, by a given user device, when a given content link 112 is unreliable, of insufficient bandwidth, experiences undesirable latency, or otherwise. A sync server 102 may instruct a given user device 104 to access such pre-cached content on an on-demand or otherwise basis. Such instructions may be provided, for at least one implementation, over one or more of the sync link 110 and/or the content link 112.

Server Power Supply 206

The sync server 102 may include a server power supply 206. The server power supply 206 may include any known or later arising technologies which facilitate the use of electrical energy by a sync server 102. Non-limiting examples of such technologies include batteries, power converters, inductive charging components, line-power components, solar power components, and otherwise.

Server Security 208

The sync server 102 may include a server security 208. The server security 208 may include any known or later arising security hardware components and/or computer instructions configured for use to secure content, communications regarding such content, server processes and data, and otherwise. Security components may be used to facilitate secure transmission, processing, storage and otherwise of any data used in accordance with an implementation of the present disclosure.

Server Communications Interface 210

The sync server 102 may include a server communications interface 210. The server communications interface 210 may be configured to use any known or later arising communications and/or networking technologies which facilitate use of the communications network 108 (as further described below). Communication interfaces are well-known in the art and non-limiting examples include Ethernet cards, USB and storage medium interface cards, radio frequency transceivers, and others.

Server User Interface 212

The sync server 102 may include a server user interface 212. The server user interface 212 may include any known or later arising human to device interface components, processes, and technologies. Non-limiting examples of interface components include devices configured for use with audible inputs (such as spoken commands) and audible outputs (generated sound), visible inputs (such as CCD captured data) and visible outputs (such as data provided for presentation on a display device), and otherwise. The server user interface 212 may be coupled to and/or include the one or more presentation devices (not shown). The presentation devices facilitate interactions between an operator and the sync server 102.

Content Providers 105, Content Nodes 106 and Content Sources 107

For at least one implementation, the system 100 may include one or more content nodes 106. Content nodes 106 may be provided individually and/or collectively with a content provider 105 and/or one or more content sources 107. Non-limiting examples of content providers 105 include SLING TV, NETFLIX, AMAZON PRIME, and others. Content providers 105 commonly receive content 108 from content sources 107. Non-limiting examples of content sources 107 include television networks, such as ABC, NBC and the like, pay-per-view transmission, online channels, and otherwise. A content provider 105 and a content source 107 may be provided in combination or separately. Content sources 107 may be communicatively coupled to one or more content providers 105 which provide content to user devices 104 via one or more content nodes 106. One or more of the content providers 105, content nodes 106 and/or content sources 107 may be similarly configured to the sync server 102 and include one or more processors, data storage components, user interface components, security components, communications, and other components. The characteristics and capabilities of such components are well known in the art and one or more of such components may be configured to execute computer instructions which facilitate cell phone watch parties. A content provider 105 and/or one or more content nodes 106 may include use of a content distribution network.

Network 109

A network 106 communicatively couples the various system 100 elements. The network 109 may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, Internet of Things (IoT) networks, Cloud based networks, private networks, public networks, or otherwise. One or more communications and networking standards and/or protocols may be used including, without limitation, the TCP/IP suite of protocols, the Extensible Message and Presence Protocol (XMPP), VOIP, Ethernet, Wi-Fi, CDMA, GSM/GRPS, TDMA/EDGE, EV/DO, WiMAX, SDR, LTE, MPEG, and others.

The network 109 may include physical data processing and communication components. The network 109 may be physically and/or virtually instantiated. Non-limiting examples of physical network components include data processing and communications components including computer servers, blade servers, switches, routers, encryption components. decryption components, and other data security components, data storage and warehousing components, and otherwise. Any known or later arising physical and/or virtual data processing and/or communications components may be utilized.

As shown in FIG. 1, one or more communications links may be established between one or more of a server 102, a user device 104, and a content node 106. A number of such communications links, including each of the communications links, may be combined or provided as single, multiple, or other combinations of communication links. Accordingly, it is to be appreciated that the communications links are described herein for purposes of functional explanation only and are not limited to any particular physical, virtual, or other configurations.

More specifically, a sync link 110 may be established between a server 102 and a user device 104. The sync link 110 may be used to facilitate communication of timing, status, and other synchronization information by and between a given user device 104 and the sync server 102.

As further shown in FIG. 1, a conference link 112 may be established between a sync server 102 and a user device 104. The conference link 114 facilitates bi-directional communication of one or more users' cell phone reactions to a given content during a cell phone content watch party. Cell phone reactions captured by a given, some, or all user device may be shared during a cell phone content watch party. Cell phone reactions may be communicated to the sync server 102 using the conference link 112 and redistributed to the other users using respective other conference links 112 established therebetween. For example, audio and/or video of a user's reaction may be communicated as a cell phone reaction over respective conference links 112 to other users while content information is communicated over respective content links 114 such that, as combined, information may be presented using an output device in a picture-in-picture, overlay, separate audio channel, mixed audio channel, text message stream, closed captioning stream, or otherwise to users showing primary content and cell phone content. Cell phone reactions may be communicated using the system 100 in separate data streams, such as separate MPEG, AAC, or other audio and/or video streams. A user device 104 and/or the sync server 102 may be configured to mix, present, or otherwise process reactions in accordance with preferences of a given user, based upon a default setting, or otherwise.

As further shown FIG. 1, a content link 114 may be established between a server 102 and a user device 104. A content link 114 facilitates communication of content information by a content node 106 to a user device 104. While depicted in FIG. 1 as a unidirectional link, it is to be appreciated that a content link 114 may be bi-directional, or otherwise.

The sync links 110, conference links 112 and content links 114 may utilize any known or later arising communications technologies, with non-limiting examples including communication links provided by wired connections, wireless connections including micro-wave, 3G/4G/5G, WIFI, BLUETOOTH, and other types, satellite connections, fiber optic connections, and otherwise.

One or more of the sync server 102, a transmitting user device 104 and/or a receiving user device 104 may be configured to transform cell phone reactions provided by a given user into an audible, visual, grammatical, phonetic, language, or other format preferred by another user. For example, audible cell phone reactions in the Spanish language may be translated into the English language. Similarly, audible cell phone reactions may be converted to text for hearing impaired users and physical cell phone reactions (such as clapping or the like) may be converted to descriptive text for visually impaired users. Other cell phone reactions may be converted as desired for any given implementation. For at least one implementation, Cloud based resources may be used for reaction conversions.

User Devices 104

Figure 3:
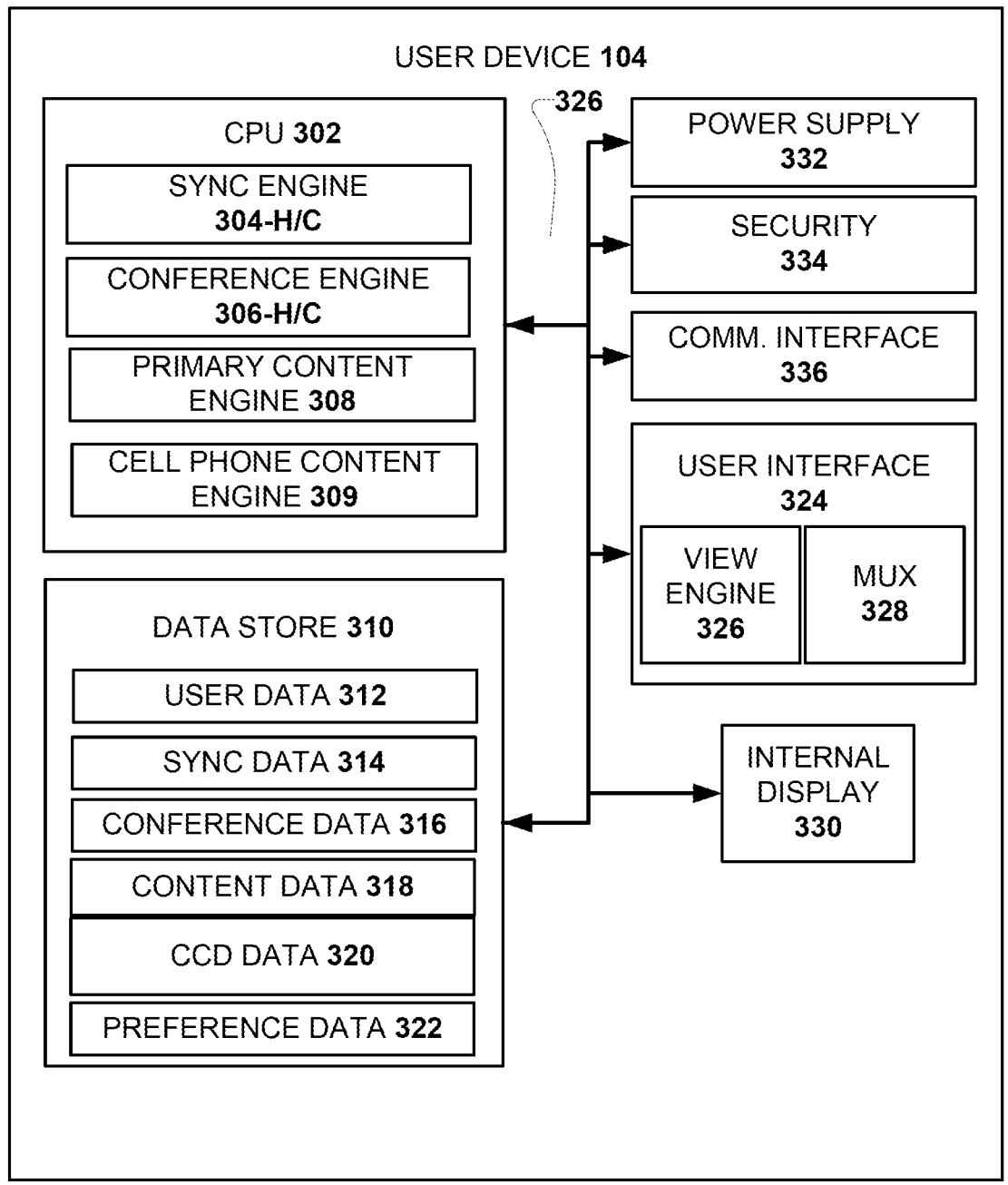
FIG. 3 is a schematic illustration of a user device for facilitating cell phone watch parties and in accordance with at least one implementation of the present disclosure.

As shown in FIG. 3, a schematic illustration of a user device 104 for facilitating cell phone watch parties, in accordance with at least one implementation of the present disclosure, may include a CPU 316, a data store 318, a power supply 320, a security 322, a communications interface 324, and a user interface 122. The user interface may further include a view engine 124, and a multiplexer ("mux") 126. A user device 104 may include an internal display 128 and may be coupled to an external display 130 (as shown in FIG. 1).

As discussed above, the system 100 includes two or more user devices 104 including a host user device 104-H and one or more client user devices 104-C. The user devices 104 may be similarly configured or may be differently configured, as desired a given implementation. Known and/or later arising device capable of receiving and presenting content to a user while facilitating collaboration during a cell phone content watch party may be used. Non-limiting examples of user devices 104 include smartphones, laptop computers, tablet computing devices, desktop computers, smart televisions, smart glasses, virtual reality glasses, augmented reality glasses, earbuds/headphones and other audible output devices, and other devices. User devices 104 may be communicatively coupled to one or more of the content nodes 106, content sources 106, and/or servers 102 using any known or later arising communications and/or networking technologies including, but not limited to, cable systems, satellite systems, streaming audio and video systems, online gaming systems, and/or other content distribution systems, on-line content distribution systems, combinations thereof, and the like.

User Device CPU 316

As shown in FIG. 3, a user device 104 may be configured to include a user device CPU 316. The user device CPU 316 may be configured similarly to and/or have less, the same, or more of the capabilities of the server CPU 202, as described above. For purposes of conciseness only, such capabilities are not repeated here. Any know or later arising data processing and other CPU technologies may be used as the user device CPU 316. The user device CPU 316 may be communicatively coupled, by a user device data bus 326 or similar structure, to other components of the user device 104 including, but not limited to, a user device data store 310, which may also be referred to as a "computer readable storage medium."

Primary Content Engine 308

The user device may also be configured to include one or more "engines" (as defined above) including a primary content engine 308. The primary content engine 308 may be configured to support the features and functions of the server sync engine 304 and the server conference engine 306 in facilitating the synchronization of primary content and of collaboration across user devices 104 participating in a cell phone content watch party.

A primary content engine 308 may be configured to facilitate such substantially simultaneous presentation of a given primary content segment by adaptively modifying one or more of the resolution, bit rate, content size, communications bandwidth utilized, communications link type used between a content node 106 and a given user device 104, or otherwise. The primary content engine 308 may be configured to retrieve and synchronize presentation of primary content on a given user device 104 in order to facilitate a cell phone content watch party. A primary content engine 308 may communicate status information over a content link 114 to a content node 106.

For at least one implementation, adaptive bitrate streaming sessions may be used between a given content node 106 and a given user device 104 to facilitate substantially simultaneous presentation of primary content during a cell phone content watch party. One or more adaptive bitrate streaming technologies may be utilized by a content node 106 and a communicatively coupled thereto primary content engine 308 executing on a given user device 104. Non-limiting examples of adaptive bitrate streaming technologies that may be utilized include MPEG-DASH, Adobe Systems HTTP Dynamic Streaming, Apple HTTP Live Streaming, Microsoft Smooth Streaming, and others. It is to be appreciated that by adaptively modifying the bitrate used to provide primary content to a given user device 104 and to multiple user devices 104 during a cell phone content watch party, primary content segments may be respectively and substantially simultaneously communicated, received, decoded, and presented on the user devices 104 participating in a cell phone content watch party.

For example, for a host user device 104-H communicatively coupled to a host content node 106-H using a 100 Mb/s connection, the host content node 106-H and/or a first host content link 114-H may be configured to provide a given content segment at a 4K resolution. For a client user device 104-C communicatively coupled to a client content node 106-C using a 15 Mb/s connection, the client content node 106-C and/or the client content link 114-C may be configured to provide the given content segment at a 720p resolution to the client user device 104-C. By providing the given primary content segment at the lower resolution it is to be appreciated that the reception and presentation of such primary content may occur substantially simultaneously (assuming user device content processing times are equal) on each of the host client device 104-H and the client user device 104-C.

Further, given that processing times for user devices 104 for given primary content segments may vary, a primary content engine 308 may be used in conjunction with a corresponding user device sync engine 304 to determine one or more transmission and/or processing characteristics (herein "transmission characteristics"), such as bandwidth, latency, resolution, processing speed, packet size, and others. Transmission characteristics may vary over time, by user device 104, and otherwise. Transmission characteristics may be suitably stored as content data 318 and in a user device data store 310. User data 218A may also be accessed by the primary content engine 116 in determining one or more characteristics of primary content information to be received from a given content source for a given user device.

Cell Phone Content Engine 309

For at least one implementation, a cell phone content engine 309 may be configured to facilitate such substantially simultaneous presentation of a given cell phone content segment by adaptively modifying one or more of the resolution, bit rate, content size, communications bandwidth utilized, communications link type used between a CCD 134, a given user device 104, and a synch server 102.

A cell phone content engine 309 may be configured to retrieve and synchronize presentation of cell phone content on a given user device 104 in order to facilitate a cell phone content watch party. A cell phone content engine 309 may be configured to communicate status information for cell phone content over the sync link 110-H to the sync server 102. Based on such status information, the sync server 102 may coordinate the providing of cell phone content to other user devices 104 participating in a given cell phone content watch party.

For an implementation, adaptive bitrate streaming sessions may be used between a given user device 104 and the sync server 118 and from the sync server 118 to other user devices 104 to facilitate substantially simultaneous presentation of cell phone content during a cell phone content watch party. One or more adaptive bitrate streaming technologies may be utilized by a user device 104 to receive user image data 138 and/or background image data 140 from a CCD 134 and further provide such image user image data 138 and/or background image data 140 to a sync server 102. A cell phone content engine 309 may be configured to further process such user image data 138 and/or background image data 140. Non-limiting examples of adaptive bitrate streaming technologies that may be utilized include MPEG-DASH, Adobe Systems HTTP Dynamic Streaming, Apple HTTP Live Streaming, Microsoft Smooth Streaming, and others. For at least one implementation, by adaptively modifying bitrates used to communicate cell phone content from a CCD 134 to a user device 140 and/or by and between a user device 104 and a sync server 102, a given cell phone content segment may be provided, decoded, and presented on each user device 104 substantially simultaneously to user devices 104 participating in a cell phone content watch party.

For example, for a host user device 104-H communicatively coupled to a host CCD 134-H using a 100 Mb/s connection, the host CCD 134-H and/or host CCD link 136-H may be configured to provide a given cell phone content segment at a 4K resolution. A client user device 104-C communicatively coupled to a client CCD 134-C using a 15 Mb/s connection, the client CCD 134-C and/or client CCD link 136-C may be configured to provide a given cell phone content segment at a 720p resolution to the client user device 104-C. By providing the given cell phone content segment at the respectively higher and lower bit rates, with such bit rates then being utilized to further communicate the cell phone content segments to other user devices participating in the given cell phone content watch party, the reception and presentation of multiple instances of cell phone content may occur substantially simultaneously (assuming user device content processing times are equal) on two or more user devices 104, such as the host user device 104-H and the client user device 104-C.

Further, given that processing times may vary for user devices 104 and for a given cell phone content segment, a cell phone content engine 309 may be used in conjunction with a corresponding user device sync engine 304 to determine one or more characteristics of a given CCD link 136, via which a given user device 104 receives user image data 138 and/or background image data 140 from a CCD 134, and one or more characteristics of a given sync link 110 and/or a given conference link 112, via which the given user device 104 communicates the as received and/or as processed user image data 138 and/or background image data 140 to the sync server 102. Non-limiting examples of such one or more characteristics include bandwidth, latency, resolution, file size, and the like. Such one or more characteristics may be suitably stored as CCD data 318 in a user device data store 310.

User data 312 may be accessed by a cell phone content engine 309 in determining one or more characteristics of cell phone content information received from a CCD 134 and/or another user device. For example, user data 312 may assist in identifying a received user image data 138-A as corresponding to the first user "A", while a second received user image data 138-B may correspond to the second user "B", while a third received user image data 138-C corresponds to the third user "C." Based on the user data 312, a cell phone content engine 309 may be configured to determine which user image data, such as first user image data 138-A or the like to output for display on an internal display 330 and/or an external display 130, how such user image data 138 is to be displayed, such as in terms of resolution, size, location, or otherwise.

CCD data 320 may also be accessed by a cell phone content engine 319 in establishing a CCD link 136 between a given user device 104 and one or more CCDs 134. For at least one implementation, the establishing of a CCD link 136 may occur using known or later arising device to device pairing protocols, such as those used for pairing BLU-ETOOTH, Z-WAVE, and other devices. For at least one implementation, a user device CPU 302 may be configured to instantiate multiple device pairing sessions, where a given device pairing session facilitates establishment of a CCD link 136 between a given user device 104 and a given CCD 134. By using multiple sessions, multiple CCDs 134 may be paired with a given user device 104. When multiple CCDs 134 are so paired to a given user device 104, such pairing occurring using e.g., BLUETOOTH and/or other device-to-device pairing technologies, the cell phone content engine 309 may be configured to identify which user image data 138 captured by a given, so paired, CCD 134 to process, present, communicate to the sync server 102, store for later processing, or otherwise execute one or more operations with respect thereto, such as outputting such user image data 330 for presentation on an internal display 330 and/or on an external display 130. The cell phone content engine 309 may cooperate with the view engine 326 and a multiplexer ("mux") 328 to provide user image data 138 and/or background image data 140 for presentation, at a given time, on a display device.

For at least one implementation, the cell phone content engine 309 may utilize preference data 322 in determining what operations to perform with respect to one or more instances of user image data 138 and/or background image data 140 received, stored and/or otherwise available for presentation to a user of a given user device. For a non-limiting example, a cell phone content engine 309 may be configured to recognize a given background image data identifies a user's home and base upon one or more preferences identified in the preference data 322 replace the background image data received from a CCD 134 with different background image data to be communicated to the sync server 102. Other data processing operations, such as filtering, replacing, obscuring, modifying, or otherwise with respect to user image data 138 and/or background image data 140 may be performed by a cell phone content engine 309 and in view of one or more preference data 322, CCD data 320, content data 318 or other data available to a given user device 140.

User Device Sync Engine 304

For at least one implementation, a user device sync engine 304 may be configured to manage synchronization of content during a live and/or recorded cell phone content watch party and while such cell phone content is provided separately by one or more CCDs 134 to a user device 104. Status information regarding the communication of cell phone content from a CCD 134 to a user device 104 may be provided by the CCD 134.

A user device sync engine 304 may be configured to cooperate with the server sync engine 304 to facilitate synchronization of primary content during a cell phone content watch party by accepting a designation of a given user device 104 as a "host" user device 104-H or as a client user device 104-C. A user device sync engine 304 may be configured to limit a user device's 104 capabilities and functions to being one or the other of a host or a client during a given watch party. For example, a given user device 140 associated with a parent of a household may be configured to function as a host or a client, while a given user device associated with a child in that household may be configured to function solely as a client for a cell phone content watch party.

A user device sync engine 304 may be configured such that upon initiating a cell phone content watch party that user device is automatically, manually, or otherwise designated as a host user device 104-H for the given cell phone content watch party. A user device sync engine 304 may be configured such that a given user device 104 participating in a given cell phone content watch party may be designated as the host at any time during the cell phone content watch party. Such designation may occur, for example, when the user device 104 seeks to seize control of the cell phone content watch party for any or no reason. For example, a parent may seek to seize control of a cell phone content watch party and become the host thereof when collaboration occurring during the cell phone content watch party includes inappropriate content.

A user device sync engine 304 for a host user device 104-H may be configured to designate another user device, such as a client user device 104-C, as the host user device, such as when a prior host is no longer participating in a given cell phone content watch party, or as otherwise needed.

Commonly, but not always, one user device 104 is designated as the host user device at any given time during a cell phone content watch party, with all other user devices are designated as client user devices. A user device sync engine 304 in each participating user device 104 may be configured to reflect the then arising status of a given user device 104.

A user device sync engine 304 may be configured to synchronize a presentation of the cell phone content, primary content and/or secondary content on one or more, if not all, user devices 104 by providing "content timing information" to the server sync engine 118. Content timing information may be provided to the server sync engine 118 by a user device sync engine 304 executing on the designated host user device 104-H. Content timing information may be provided to the server sync engine 118 and each client user device 104-C by the user device sync engine 304 executing on the designated host user device 104-H. Content timing information may be provided to the server sync engine 118 by corresponding user device sync engines 118 executing on each of the host and client user devices 1040-H/C. Content timing information may be provided by a given user device 104 to the sync server 102 and/or any other user device 104 participating in a given cell phone content watch party on any desired basis, periodicity, or otherwise.

For at least one implementation, a client user device sync engine 304 may be configured to periodically receive content timing information for the host user device 104-H from the sync server 102.

For at least one implementation, a user device sync engine 304 may be configured to facilitate use of one or more trick-play modes during a cell phone content watch party. Trick-play modes, when supported for a given cell phone content, primary content, or secondary content, may be requested, via the user device sync engine 304, by a client user device 104-C for approval of and selected by the host user device 104-H. A trick-play mode selected by the host user device 104-H may be communicated by a user device sync engine 304 executing thereon and to the server sync engine 118, and further communicated to a user device sync engine 304 executing on a client user device 104-C participating in the given cell phone content watch party.

A communication of a selected trick-play mode by a host user device 104-H to the server sync engine 118 and thereon to a client device 104-C may include content timing information specifying a start location for the selected trick-play mode, an identification of the type of trick-play mode selected, and (where appropriate) an end UTC location specifying where normal play mode is to resume, and/or other information useful in facilitating implementation of the selected trick-play mode by the client user device 104-C participating in the given cell phone content watch party. The user device sync engine 304 may be configured to capture the information needed to facilitate trick-play modes across one or more, if not all, client user devices 104-C participating in a given cell phone content watch party. A trick play mode may be applied, in synchronization, with primary content, secondary content and cell phone content which has been presented to a user device 104 at substantially the same time, as designated, for example, by a UTC location.

A user device sync engine 304 on a client user device 104-C may be configured to modify trick-play instructions, as received from a host user device 104-H and via the sync server 102. Such modified trick-play instructions may be unique for the given client user device 104-C. It is to be appreciated that modifications of trick-play instructions, may be in view of and/or based upon client content timing information generated by the given client user device 104-C. Such client content timing information may be indicative of synchronization issues a given client user device has been experiencing during a given cell phone content watch party, such as repeatedly receiving the given cell phone content or primary content at a faster or slower rate than occurs with respect to the host user device 104-H and adjustments made by the user device sync engine 304 independently or based upon adjustment instructions received from the server sync engine 118.

A given client user device sync engine 304 may be configured such that a given cell phone content segment, as communicated to the given client user 104-C, occurs such that any latency, user device delays, and/or other issues arising with the communication, processing, and/or presenting of a given portion of the cell phone content segment by the given client user device 104-C are addressed (if addressable) such that the presentation of future arising given cell phone content segments by that client user device 104-C occurs substantially simultaneously with the presentation of the future cell phone content segments by the host client user device 104-H. The server sync engine 118 may be configured to facilitate synchronization of cell phone content segments by a user device sync engine 304 such that presentation of future cell phone content occurs substantially simultaneously across two or more user devices 104-C participating in a given cell phone content watch party.

A user device sync engine 304 may be configured such that adjustments to presentations of cell phone content by a client user device 104-C, in view of content timing information provided by the host user device 104-H, occurs such that the presentation of such cell phone content by the client user device 104-C is at one or more of a preferred quality setting, a minimum quality setting, a maximum quality setting, or otherwise.

When a specified quality setting is not achievable, at a given time and/or over a given period, by a given client user device 104-C, the user device sync engine 304 for such client user device 104-C may take corrective actions until such desired quality settings can be realized thereby. Non-limiting examples of such corrective actions include: pausing, fast forwarding, slowing down, or otherwise modifying how cell phone content is provided to a given client user device 104-C.

A user device sync engine 304 may be configured to use user device sync data 314 including, but not limited to, content timing information including, but not limited to, fast-play, slow-play and other sync options, provided by one or more user devices 104. User device sync data 314 may include all, a subset of, additional, different, or the same data and/or computer instructions used to facilitate synchronization of cell phone content presentation during a cell phone content watch party. Non-limiting examples of user device sync data 314 include communications sockets used by user devices 104 to connect with a content provider 105 and/or a content node 106, IP addresses for user devices 104, user device identifiers, such as MAC addresses, communications network settings used for one or more of the content links 114 or sync links 110, available buffer and/or storage on a user device 104, and otherwise.

A user device sync engine 304 may use user device user data 312 to a facilitate synchronization of cell phone content during a cell phone content watch party. User device user data 312 may include all, a subset of, additional, different, or the same data and/or computer instructions used to facilitate synchronization of primary content presentation during a watch party and/or during a cell phone content watch party as provided in the server user data 204A. Non-limiting examples of user device user data 312 include user demographic information, user device information such as capabilities, technologies supported, and the like, user preferences, user viewing histories, and the like.

User Device Conference Engine 306

A user device conference engine 306 may be configured to facilitate collaboration by and between users, via their respective user devices 104, during a cell phone content watch party, and using the two or more conference links 112 established with the sync server 102.

Synchronization of and collaboration by and between users (via their respective user devices 104) during a given cell phone content watch party may be decoupled from one or more of a providing of content (by the content nodes 106 to the user devices 104) and/or any synchronization of content presentation, as facilitated by the user device conference engine 306 in cooperation with the server conference engine 120. A user device conference engine 306 may be configured to provide of reactions of a given user with the sync server 102 independently of other cell phone content watch party elements.

A user device conference engine 306 may be configured to support collaboration between users in any humanly perceptible format; non-limiting examples including speech, video, text, emoticons, gestures, or otherwise. For at least one embodiment, the conference links 112 and collaborative aspects of a cell phone content watch party may be established or unestablished at any time. A user device conference engine 306 may be configured to leverage proprietary, custom, open source, or otherwise provided conferencing software applications including, but not limited to, JITSI MEET, WEBEX, ZOOM, and otherwise.

A user device conference engine 306 may be configured to utilize user device conference data 316. User device conference data 316 may include all, a subset of, additional, different, or the same data and/or computer instructions used to facilitate synchronization of content presentation during a cell phone content watch party as provided by server conference data 204C. User device conference data 316 may include any data and/or computer instructions which facilitate collaboration during a cell phone content watch party. Non-limiting examples of user device conference data 316 include communications sockets used by user devices, IP addresses for user devices, user device identifiers, such as MAC addresses, communications network settings used for one or more conference links 112 and otherwise. A user device conference engine 306 may be configured to use user data 312 to a facilitate collaboration during a cell phone content watch party.

Various user device conference data 316 may be stored in the user device data store 310 and used by the user device conference engine 306 in facilitating collaboration during a cell phone content watch party. Non-limiting examples of such user device conference data 316 include type of connection, distance of a user device 104 from a sync server 102, maximum available bandwidth for a given conference link 112, throughput for the conference link 112, latency, and other data. User device conference data 316 may be provided for one or more conference links 112 used during a cell phone content watch party.

A user device conference engine 306 may be configured to facilitate any desired singular or combination of voice, video, web, or other conferencing activities including, but not limited to, chat, private rooms, polling, voting, verbal reactions, visible reactions, emoticons, or the like. A user device conference engine 306 may facilitate user-to-user (or private) communications, user-to-multiple user (or semi-private) communications, user-to-all (or public) communications, or otherwise during a cell phone content watch party.

A user device conference engine 306 may be configured to store user communications during a given cell phone content watch party in the user device data store 310 as user device conference data 316. User device conference data 316 may be time stamped and/or otherwise synchronized with respect to a given cell phone content segment such that a later playback of the conference data and/or the given cell phone content segment may include the conference data corresponding to such given cell phone content segment, as such conference data was generated during the given cell phone content watch party. For example, a later viewing of the football program—the primary content—and cell phone content watch party by a user of the given user device 104 may include a presentation of the user device conference data 316 arising during the original cell phone content watch party. Synchronization and presentation information provided by user device conference data 316 may enable the user of the given client user device to later enjoy the original cell phone content watch party as if participating real-time even though such cell phone content watch party may in fact have occurred earlier.

User Device Power Supply 332

A user device 104 may include a user device power supply 332. The user device power supply 332 may include any known or later arising technologies which facilitate the use of electrical energy by a user device 104. Non-limiting examples of such technologies include batteries, power converters, inductive charging components, line-power components, solar power components, and otherwise.

User Device Security 222

A user device 104 may include a user device security 334. The user device security 334 may include any known or later arising security hardware components and/or computer instructions configured for use to secure content, communications regarding such content, user device processes and data, and otherwise. Security components may be used to facilitate secure transmission, processing, storage and otherwise of any data used in accordance with an embodiment of the present disclosure.

User Device Communications Interface 336

A user device 104 may include one or more user device communications interface 336. A user device communications interface 336 may be configured to use any known or later arising communications and/or networking technologies which facilitate use of the communications network 109 (as further described herein).

User Device User Interface 324

A user device 104 may include a user device user interface 324. The user device user interface 324 may include any known or later arising human to device interface components, processes, and technologies. Non-limiting examples of input/output uses include audible inputs (such as spoken commands) and outputs (generated sound), visible inputs (such as eye tracking and facial recognition) and outputs (such as visible images presented on a display device, LEDs, or otherwise), touch inputs touch feedback (such as vibrations or other movements), gesture tracking, and otherwise. The user device user interface 324 may be coupled to and/or include the one or more presentation devices such as an internal display 330 and/or an external display 130.

A user device user interface 324 may be configured to include one or more view engines 326. A view engine 326 is an "engine" (as defined above) which facilitates presentation of cell phone content from a given view or perspective. A view engine 326 may facilitate presentation of collaboration information as received by the given user device from the sync server 102. Collaboration information presented by a view engine 326 for a first user device, such as a host 104-H, may be the same or different than collaboration information presented by a view engine 326 for a given client user device 104-C.

A user device user interface 324 may include a multiplexer ("mux") 328. A mux 328 may be provided as an "engine" (as defined above). A mux 328 may combine collaboration data received from the sync server 102 with cell phone content data received from a CCD 134 and with primary content received from a content node 106. A combined presentation may be output by the mux 328 as an integrated presentation of the primary content, cell phone content and other collaboration data (when available).

A mux 328 may be configured to modify or adapt an integrated presentation of primary content and cell phone content based upon one or more characteristic of the cell phone content. For example, a mux 328 may be configured to mute and/or decrease the volume of primary content audio and/or dim a brightness of a primary content video when the cell phone content includes spoken audio by a user of a client device 104-C. A mux 328 may be configured to receive an input signal from a user input device, such as a keyboard, button, detected gesture, or the like indicative that a user of the given user device desires to provide cell phone content to other users during a cell phone content watch party. In response to such input, the mux 328 may be configured to mute primary content audio or dim a primary content video while the user provides the cell phone content.

Similarly, and for at least one embodiment, other properties of a given primary content, such as video content properties, may be adjusted by the mux 328 when cell phone is being provided by a user and such cell phone content may conflict with or otherwise be given priority and/or precedence over the then arising primary content. For example, primary content video information may be dimmed, diminished in brightness, diminished in sizing, resolution, or otherwise when cell phone content is provided. Such video collaboration information may be identified as having a higher priority than the content information by a user of a user device configured to provides such prioritization to the cell phone content, such as, but not limited to, a host user device 104-H. For example, a cell phone content watch party that includes an unexpected marriage proposal may be configured to provide priority or other emphasis to cell phone content captured by a CCD 134 during the wedding proposal over the otherwise arising primary content.

Internal Display 330

A user device user interface 324 may be coupled to an internal display 330. The internal output device 330 may include any singular or combination of visual display devices configured to provide in whole or in part, one or more of primary content and cell phone content. Non-limiting examples of internal displays 330 includes display screens or panels, speakers, vibrational elements, lights, and the like. A user interface 324 may be configured to provide cell phone content on the internal display 330 while providing primary content on an external display 130, or vice-versa.

External Display 130

A user device 104 may be communicatively coupled to an external display 130. Such coupling may occur directly, indirectly such as via use of a 10-Foot device, or otherwise. Multiple external displays 130 may be used in conjunction with a user device 140. For a non-limiting example, cell phone content may be presented on a first external display 130, while primary content is presented on a second external display 130. A user device sync engine 304 may present primary content segments received from a content node 106 such that the cell phone content segments received from a CCD 134 may be synchronized therewith.

For at least one implementation, primary content may be presented in a primary content window 142, while cell phone content, such as user image data 146 and/or background image data 148 is presented in a secondary content window 144. Multiple forms of content may be presented as an overlay, in separate windows, multi-picture, picture-in-picture, or otherwise.

For at least one embodiment, a user device user interface 324 may be configured to receive and/or output cell phone content segments that include one or more types of data including audio cell phone content, visual cell phone content, and others. Such inputs and outputs may occur using known and/or later arising interfaces therewith, herein "I/O interfaces." Various non-limiting features and functions of such I/O interface are described herein.

Audio I/O Interface

An audio I/O interface may support a receiving and/or presenting of audible cell phone content to a user via a user device 104. Such audible cell phone content (which is also referred to herein as being "audible signals") may include spoken text, sounds, or any other audible information. Such audible signals may include one or more of humanly perceptible audio signals, where humanly perceptible audio signals typically arise between 20 Hz and 20 KHz. For at least one embodiment, the range of humanly perceptible audio signals may be configurable to support an audible range of a given individual user.

An audio I/O interface generally includes hardware and computer instructions (herein, "audio technologies") which supports the input and (as desired) output of audible signals to a user. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise.

An audio I/O interface may use one or more microphones and speakers to capture and present audible signals respectively from and to a user. Such one or more microphones and speakers may be provided by a given user device 104 itself or by a device communicatively couple additional audible device component. For example, earbuds may be communicatively coupled to a smartphone, with the earbuds functioning as an audio I/O interface and capturing and presenting audio signals as sound waves to and from a user, while the smartphone functions as a user device.

For at least one embodiment, an audio I/O interface may be configured to automatically recognize and capture comments spoken by a user and intended as audible signals for sharing with other users during a cell phone content watch party. Such identification may occur as a default setting of the audio I/O interface into a "capture" mode, based upon analysis and recognition of spoken comments as being intended for one or more second users attending a cell phone content watch party.

For example, a comment such as, "Go CHIEFS," where "CHIEFS" refers to an NFL football team participating in a game being presented during a cell phone content watch party, may be automatically captured, and shared as one or more audible signals by an audio I/O interface with other users during the cell phone content watch party. The analysis and determination of which captured sounds to share with select if not all users during a cell phone content watch party may be accomplished by execution of corresponding computer instructions by one or more of a user device conference engine 306, a user device user interface 324, and/or in conjunction with computer instructions executed by a server conference engine 120.

Visual I/O Interface

A user device 104 may include a visual I/O interface configured to support the receiving and presenting of visual cell phone content (which is also referred to herein as being "visible signals") between user devices during a cell phone content watch party. Such visible signals may be in any desired form, such as still images, motion images, augmented reality images, virtual reality images, and otherwise.

A visual I/O interface generally includes hardware and computer instructions (herein, "visible technologies") which supports the input by and (as desired) output of visible signals to other user devices during a cell phone content watch party. Such visible technologies may include technologies for converting images (in any spectrum range) into humanly perceptible images, converting content of visible images into a given user's perceptible content, such as by character recognition, translation, playback rate adjustment, playback frequency adjustment, and otherwise.

A visual I/O interface may be configured to use one or more display devices, such as the internal display 330 and/or external display 130, that are configured to present visible signals to a user. A visual I/O interface may be configured to use one or more CCDs 134 and/or other image capture devices to capture visual cell phone content. Non-limiting examples include lenses, digital image capture and processing software and the like. Accordingly, it is to be appreciated that any existing or future arising visual I/O interfaces, devices, systems and/or components may be utilized by and/or in conjunction with a user device to facilitate the capture, communication and/or presentation of visual cell phone content (i.e., visible signals) during a cell phone content watch party.

In at least one implementation of the present disclosure, during a cell phone content watch party users may provide their comments visibly for presentation to other users and receive representations of other user's comments visibly using one or more visible signals provided with a cell phone content segment.

A method for implementing a cell phone content watch party may include querying a user of a user device 104 whether they desire to provide cell phone content. If so, an identification and pairing operation may occur by which a first CCD 134 associated with the user is first identified and then paired to their user device. The method may further include querying as to whether the first user and/or a second user desires to provide second cell phone content, such as second cell phone content captured by a second CCD 134. If so, a second identification and pairing of the second CCD 134 with the given user device 104 occurs. When more than one CCD 134 is paired with a user device 104 during a cell phone content watch party, the process may further include determining whether a prioritization, a unique processing, or other operation is to be applied to cell phone content segments received from a given CCD 134. The method may further include determining whether a given primary content, secondary content, and/or cell phone content is to be presented on one or more displays, in windows on a common display, not displayed at all, have backgrounds modified or unmodified, or otherwise. The process may include replacing background images with a primary content. A method may include some, all or different and/or additional operations than those described above.

Although various implementations have been described above with a certain degree of particularity, or with reference to one or more individual implementations, those skilled in the art could make numerous alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "next," "last," "before," "after," and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings shall be interpreted as illustrative of implementations and not limiting. Changes in detail or structure may be made without departing from the basic elements of the present disclosure as defined in the following claims.

What is claimed is:

1. A system, facilitating a cell phone content watch party, comprising:
   a sync server comprising a server CPU;
   a host user device communicatively coupled to the sync server;
   a client user device communicatively coupled to the sync server;
   a content capture device (CCD) communicatively coupled to the host user device; and
   a content provider, communicatively coupled to the host user device and the client user device;
   wherein the content provider provides primary content segments to the host user device and the client user device;
   wherein the CCD provides cell phone content to the host user device;
   wherein the host user device provides the cell phone content to the sync server;
   wherein the sync server synchronizes a providing of the cell phone content with a presentation of the primary content segments by the client user device; and
   wherein the presentations of the cell phone content and the primary content segments occur substantially simultaneously on the host user device and the client user device;
   wherein the server CPU is operable to instantiate a server sync engine;
   wherein the server sync engine executes first non-transient computer instructions facilitating the synchronization of the presentation of the cell phone content with the presentation of the primary content, by performing synchronization operations including:
   receiving content timing information from the host user device;
      wherein the content timing information identifies when a first portion of the primary content is first received, at a first time, by the host user device and when a first portion of the cell phone content is provided, by the CCD, to the host user device;
   determining when the first portion of the primary content is second received, at a second time, by the client user device;

determining a delay between the content timing information and the second time;

setting, based on the delay, an adjustment;

instructing the client user device to adjust, based on the adjustment, a client user device presentation of the primary content and the cell phone content; and wherein the adjusting facilitates substantially simultaneous presentation of another portion of the primary content by the client user device and the host user device with a substantially simultaneous presentation of another portion of the cell phone content received by the host user device by the client user device.

2. The system of claim 1, wherein the primary content segments comprise live content; and wherein the cell phone content includes user image data for a first user.

3. The system of claim 1, wherein the content provider further comprises a content distribution network including a host content node and a client content node;

wherein the host user device is communicatively coupled to the host content node; and wherein the client user device is communicatively coupled to one of the client content node.

4. The system of claim 1, wherein the instructing of the client user device to adjust the client user device presentation of the primary content and the cell phone content further comprises apply a trick-play mode operation to both the primary content and the cell phone content.

5. The system of claim 4, wherein the trick-play mode operation is a pause and a seek operation.

6. The system of claim 4, wherein the synchronization operations further comprise:

determining whether the delay exceeds a delay interval;

when the delay exceeds the delay interval, setting the adjustment; and when the delay does not exceed the delay interval, periodically determining whether a current portion of the primary content is being presented substantially simultaneously by the host user device and the client user device.

7. The system of claim 6, wherein the delay interval is a predetermined delay of between 100 milliseconds and 1000 milliseconds.

8. The system of claim 1, wherein the server CPU instantiates a server conference engine;

wherein the server conference engine execute second non-transient computer instructions facilitating collaboration between a host user device user and a client user device user by performing conferencing operations including:

determining whether a cell phone content segment has been received by the sync server from the host user device; and when received, determining a type of the cell phone content segment.

9. The system of claim 8, wherein the type of the cell phone content segment is at least one of an audible signal and a visible signal.

10. The system of claim 8, wherein the second non-transient computer instructions facilitate operations further comprising:

identification of a user associated with the cell phone content segment; and prioritization of the cell phone content segment based on the identification of the user.

11. The system of claim 10, wherein the prioritization includes instructing the client user device to present the cell phone content segment during the cell phone content watch party.

12. The system of claim 11, wherein the prioritization include instructing the client user device to not present the cell phone content segment during the cell phone content watch party.

13. The system of claim 1, further comprising:

a ten-foot device communicatively coupled to the content provider and the client user device; and wherein the cell phone content includes collaborations arising between user of the host user device and the client user device.

14. The system of claim 13, further comprising:

an external output device communicatively coupled to the ten-foot device and the client user device;

wherein the client user device comprises an internal output device;

wherein the collaborations are presented to a client user using the internal output device; and wherein the primary content is presented to the client user using the ten-foot device.

15. The system of claim 1, wherein the host user device further comprises:

a host user device CPU which instantiates a user device sync engine;

wherein the user device sync engine executes non-transient computer instructions facilitating the synchronization of the cell phone content with a presentation of the primary content segments by the host user device on a display;

wherein the cell phone content includes a cell phone content segment that is presented on the display and includes user image data superimposed upon a background image; and wherein the background image includes at least one of the primary content segments.

* * * * *